US008885447B2

(12) United States Patent
Matsumoto et al.

(10) Patent No.: US 8,885,447 B2
(45) Date of Patent: Nov. 11, 2014

(54) GLASS FOR MAGNETIC RECORDING MEDIUM SUBSTRATE, GLASS SUBSTRATE FOR MAGNETIC RECORDING MEDIUM, AND THEIR USE

(71) Applicant: Hoya Corporation, Tokyo (JP)

(72) Inventors: Naomi Matsumoto, Shinjuku-ku (JP); Kazuaki Hashimoto, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/839,484

(22) Filed: Mar. 15, 2013

(65) Prior Publication Data
US 2013/0343166 A1    Dec. 26, 2013

Related U.S. Application Data

(60) Provisional application No. 61/617,432, filed on Mar. 29, 2012.

(51) Int. Cl.
| G11B 11/00 | (2006.01) |
| G11B 7/00 | (2006.01) |
| G11B 7/24 | (2013.01) |
| G11B 5/73 | (2006.01) |
| G11B 5/84 | (2006.01) |

(52) U.S. Cl.
CPC ............ *G11B 5/7315* (2013.01); *G11B 5/8404* (2013.01)
USPC .................. 369/13.02; 369/13.35; 369/13.51; 369/13.5; 369/275.1

(58) Field of Classification Search
None
See application file for complete search history.

(56) References Cited

U.S. PATENT DOCUMENTS

| 5,900,296 | A | 5/1999 | Hayashi et al. |
| 5,958,812 | A | 9/1999 | Koch et al. |
| 6,949,485 | B2 | 9/2005 | Nakashima et al. |
| 7,189,438 | B2 | 3/2007 | Momose et al. |
| 7,309,671 | B2 | 12/2007 | Kurachi et al. |
| 7,595,273 | B2 | 9/2009 | Ikenishi et al. |
| 7,687,419 | B2 | 3/2010 | Kawai |
| 7,767,607 | B2 | 8/2010 | Kurachi et al. |
| 8,119,267 | B2 * | 2/2012 | Osakabe et al. ........... 428/846.3 |
| 2002/0010066 | A1 | 1/2002 | Nakashima et al. |
| 2003/0220183 | A1 | 11/2003 | Kurachi et al. |
| 2004/0229006 | A1 | 11/2004 | Momose et al. |

(Continued)

FOREIGN PATENT DOCUMENTS

| JP | 09-507206 A | 7/1997 |
| JP | 10-226532 A | 8/1998 |

(Continued)

OTHER PUBLICATIONS

International Search Report and Written Opinion dated Jun. 18, 2013, issued in International Application No. PCT/JP2013/056966.

*Primary Examiner* — Muhammad N Edun
(74) *Attorney, Agent, or Firm* — Sughrue Mion, PLLC

(57) ABSTRACT

An aspect of the present invention relates to glass for a magnetic recording medium substrate, which comprises essential components in the form of $SiO_2$, $Li_2O$, $Na_2O$, and one or more alkaline earth metal oxides selected from the group consisting of MgO, CaO, SrO, and BaO wherein a molar ratio of a content of CaO to a combined content of MgO, CaO, SrO, and BaO (CaO/(MgO+CaO+SrO+BaO)) is equal to or less than 0.20, and which has a glass transition temperature of equal to or higher than 650° C.

29 Claims, 5 Drawing Sheets

(56) References Cited

U.S. PATENT DOCUMENTS

| | | | |
|---|---|---|---|
| 2005/0164036 A1* | 7/2005 | Zou | 428/694 ST |
| 2005/0215414 A1 | 9/2005 | Kawai | |
| 2005/0244656 A1 | 11/2005 | Ikenishi et al. | |
| 2008/0053152 A1 | 3/2008 | Kurachi et al. | |

FOREIGN PATENT DOCUMENTS

| | | |
|---|---|---|
| JP | 11-232627 A | 8/1999 |
| JP | 2001-058843 A | 3/2001 |
| JP | 2001-134925 A | 5/2001 |
| JP | 2001-294441 A | 10/2001 |
| JP | 2001-348246 A | 12/2001 |
| JP | 2003-238196 A | 8/2003 |
| JP | 2003-283028 A | 10/2003 |
| JP | 2004-043295 A | 2/2004 |
| JP | 2004-352571 A | 12/2004 |
| JP | 2004-362746 A | 12/2004 |
| JP | 2005-272212 A | 10/2005 |
| JP | 2005-314159 A | 11/2005 |
| JP | 2006-327935 A | 12/2006 |
| JP | 2007-051064 A | 3/2007 |
| JP | 2009-110626 A | 5/2009 |
| JP | 2011-253575 A | 12/2011 |
| WO | 03102928 A1 | 12/2003 |
| WO | 2010-032766 A1 | 3/2010 |

* cited by examiner

GLASS FOR MAGNETIC RECORDING MEDIUM SUBSTRATE, GLASS SUBSTRATE FOR MAGNETIC RECORDING MEDIUM, AND THEIR USE

CROSS-REFERENCE TO RELATED APPLICATIONS

This application claims the benefit of priority under 35 USC 119 to U.S. Patent Application No. 61/617,432 filed on Mar. 29, 2012, which is expressly incorporated herein by reference in its entirety.

BACKGROUND OF THE INVENTION

1. Field of the Invention

The present invention relates to glass for a magnetic recording medium substrate that is suitable as a substrate material for magnetic recording media such as hard disks; a glass substrate for a magnetic recording medium employing the above glass; a magnetic recording medium substrate blank usable for obtaining the above substrate; a magnetic recording medium equipped with the above substrate; and a magnetic recording apparatus.

2. Discussion of the Background

With the development of information-related infrastructure such as the Internet, the need for information recording media such as magnetic disks and optical disks has increased sharply. The main structural components of the magnetic memory devices of computers and the like are magnetic recording media and magnetic heads for magnetic recording and reproduction. Known magnetic recording media include flexible disks and hard disks. Of these, examples of the substrate materials employed in hard disks (magnetic disks) include aluminum substrates, glass substrates, ceramic substrates, and carbon substrates. In practical terms, depending on size and application, aluminum substrates and glass substrates are primarily employed. In the hard disk drives of laptop computers, along with higher density recording of magnetic recording media in addition to impact resistance, the requirement of increased surface smoothness of the disk substrate is intensifying. Thus, there are limits to how well aluminum substrates, with afford poor surface hardness and rigidity, can respond. Accordingly, the development of glass substrates is currently the mainstream (for example, see Published Japanese Translation of a PCT international publication for patent application (TOKUHYO) No. Heisei 9-507206 or English language family member U.S. Pat. No. 5,958,812, Japanese Unexamined Patent Publication (KOKAI) No. 2007-51064 or English language family member U.S. Pat. No. 5,900,296, Japanese Unexamined Patent Publication (KOKAI) No. 2001-294441, Japanese Unexamined Patent Publication (KOKAI) No. 2001-134925, Japanese Unexamined Patent Publication (KOKAI) No. 2001-348246, Japanese Unexamined Patent Publication (KOKAI) No. 2001-58843 or English language family member US2002/010066A1 and U.S. Pat. No. 6,949,485, Japanese Unexamined Patent Publication (KOKAI) No. 2006-327935, Japanese Unexamined Patent Publication (KOKAI) No. 2005-272212 or English language family members US 2005/215414A1 and U.S. Pat. No. 7,687,419, Japanese Unexamined Patent Publication (KOKAI) No. 2004-43295 or English language family member US2003/220183A1, U.S. Pat. No. 7,309,671, US2008/053152A1, and U.S. Pat. No. 7,767,607, Japanese Unexamined Patent Publication (KOKAI) No. 2005-314159 or English language family members US 2005/244656A1 and U.S. Pat. No. 7,595,273; which are expressly incorporated herein by reference in their entirety.)

In recent years, with the goal of achieving even higher density recording in magnetic recording media, the use of magnetic materials of high magneto-anisotropic energy (magnetic materials of value), such as Fe—Pt and Co—Pt based materials, is being examined (for example, see Japanese Unexamined Patent Publication (KOKAI) No. 2004-362746 or English language family members US 2004/229006A1 and U.S. Pat. No. 7,189,438; which are expressly incorporated herein by reference in their entirety). It is necessary to reduce the particle diameter of the magnetic particles to achieve higher density recording. However, when just the particle diameter is reduced, the deterioration of magnetic characteristics due to thermal fluctuation becomes a problem. Magnetic materials of high Ku value tend not to be affected by thermal fluctuation, and are thus expected to contribute to the achievement of greater recording density.

However, the above-described magnetic materials of high Ku value must be in a specific state of crystal orientation to exhibit a high Ku value. Thus, a film must be formed at high temperature or thermoprocessing must be concluded at high temperature following film formation. Accordingly, the formation of a magnetic recording layer comprised of such magnetic materials of high Ku value requires that a glass substrate have high heat resistance that is capable of withstanding the above-described processing at high temperatures, that is, have a high glass transition temperature.

Additionally, in recent years, to enhance the reliability of HDDs (Hard Disk Drives), good impact resistance has come to be demanded of the glass substrates employed in magnetic recording media of which extremely high recording densities are required. This has included energy-assisted magnetic recording media, the investigation of which is advancing.

As a first example, given this background, the flying height of the magnetic head (the gap between the magnetic head and the surface of the magnetic recording medium) has greatly decreased (flying height reduction). As that has occurred, the distance between the recording head and the magnetic layer of the medium has decreased, making it possible to pick up the signals of smaller magnetic particles, and permitting in turn even higher recording densities. In recent years, to achieve greater flying height reduction than in the past, a function known as DFH (Dynamic Flying Height) has been imparted to magnetic heads. It is a function whereby a heating element such as an extremely small heater is disposed in the vicinity of the recording and reproduction elements of the magnetic head, with just the area around the elements protruding toward the surface of the medium. In the future, based on this function, it is thought that the gap between the elements of the magnetic head and surface of the medium will decrease to less than 2 nm. Thus, even a slight shock will tend to cause the magnetic head to collide with the surface of the medium.

A second example is rapid rotation of the medium. That causes collisions with the magnetic head to increase when undergoing a shock. Since there is substantial deflection of the substrate at its outer perimeter, even a slight shock tends to cause a collision with the magnetic head. Due to the effects of fastening (securing) the medium with a spindle and clamps, there is a substantial possibility of the substrate cracking along the inner circumference portion when the HDD itself is subjected to an external shock.

Thus, there is need for a glass substrate having both high heat resistance and good impact resistance in magnetic recording media corresponding to high recording densities.

SUMMARY OF THE INVENTION

An aspect of the present invention provides for glass for a magnetic recording medium substrate that is suitable as the material of a glass substrate for a magnetic recording medium having both high heat resistance and good impact resistance as set forth above, and a glass substrate for a magnetic recording medium; and provides for a magnetic recording medium equipped with the above substrate and a magnetic recording apparatus in which the above magnetic recording medium is mounted.

An aspect of the present invention relates to:
glass for a magnetic recording medium substrate, which comprises:
essential components in the form of $SiO_2$, $Li_2O$, $Na_2O$, and one or more alkaline earth metal oxides selected from the group consisting of MgO, CaO, SrO, and BaO;
wherein a molar ratio of a content of CaO to a combined content of MgO, CaO, SrO, and BaO (CaO/(MgO+CaO+SrO+BaO)) is equal to or less than 0.20; and which has a glass transition temperature of equal to or higher than 650° C.

A further aspect of the present invention relates to:
a glass substrate for a magnetic recording medium, which is comprised of chemically strengthened glass that has been prepared by chemically strengthening the above glass for a magnetic recording medium substrate.

A further aspect of the present invention relates to:
a glass substrate for a magnetic recording medium, which is comprised of chemically strengthened glass having a glass transition temperature of equal to or higher than 650° C. in which a tensile stress distribution is convex in shape such that the convex shape does not contain indentations indenting to a compressive stress side in a stress profile in a virtual cross section perpendicular to two main surfaces as obtained by the Babinet method.

A further aspect of the present invention relates to:
a glass substrate for a magnetic recording medium, which is comprised of chemically strengthened glass having a glass transition temperature of equal to or higher than 650° C. in which an average value Tav of a tensile stress obtained by the Babinet method and a maximum value Tmax of the tensile stress satisfy the following equation (1):

$$Tav/Tmax \geq 0.5.$$

A further aspect of the present invention relates to:
a glass substrate blank for a magnetic recording medium, which comprises:
essential components in the form of $SiO_2$, $Li_2O$, $Na_2O$, and one or more alkaline earth metal oxides selected from the group consisting of MgO, CaO, SrO, and BaO;
wherein a molar ratio of a content of CaO to a combined content of MgO, CaO, SrO, and BaO (CaO/(MgO+CaO+SrO+BaO)) is equal to or less than 0.20; and which has a glass transition temperature of equal to or higher than 650° C.

A further aspect of the present invention relates to:
a method of manufacturing a glass substrate blank for a magnetic recording medium, which comprises:
blending glass starting materials to provide glass comprising essential components in the form of $SiO_2$, $Li_2O$, $Na_2O$, and one or more alkaline earth metal oxides selected from the group consisting of MgO, CaO, SrO, and BaO; wherein a molar ratio of a content of CaO to a combined content of MgO, CaO, SrO, and BaO (CaO/(MgO+CaO+SrO+BaO)) is equal to or less than 0.20; and which has a glass transition temperature of equal to or higher than 650° C.;
melting the blended glass starting materials to provide a glass melt; and
press molding the glass melt that has been provided to prepare a substrate blank comprised of the glass.

A further aspect of the present invention relates to:
a method of manufacturing a glass substrate for a magnetic recording medium, which comprises processing the above glass substrate blank for a magnetic recording medium.

A further aspect of the present invention relates to:
a method of manufacturing a glass substrate for a magnetic recording medium, which comprises:
preparing a glass substrate blank for a magnetic recording medium by the above method; and
processing the substrate blank.

A further aspect of the present invention relates to:
a magnetic recording medium, which comprises a magnetic recording layer on the above glass substrate for a magnetic recording medium.

A further aspect of the present invention relates to:
a method of manufacturing a magnetic recording medium, which comprises:
forming a magnetic recording layer by conducting an annealing process after forming a film of a magnetic material comprising as a main component an alloy of Pt with Fe and/or Co, on the main surface of the above glass substrate for a magnetic recording medium.

A further aspect of the present invention relates to:
a magnetic recording apparatus of energy-assisted magnetic recording system, which comprises:
a heat-assisted magnetic recording head having a heat source to heat at least a main surface of a magnetic recording medium, a recording element member, and a reproduction element member; and
the above magnetic recording medium.

An aspect of the present invention can provide glass for a magnetic recording medium substrate that is suitable as the material of a magnetic recording medium glass substrate having both high heat resistance and good impact resistance; and a glass substrate for a magnetic recording medium.

A further aspect of the present invention can provide a magnetic recording medium equipped with the above substrate, and a magnetic recording apparatus in which the magnetic recording medium is mounted.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the figure, wherein.

DETAILED DESCRIPTION OF THE EMBODIMENTS

Figure 1:
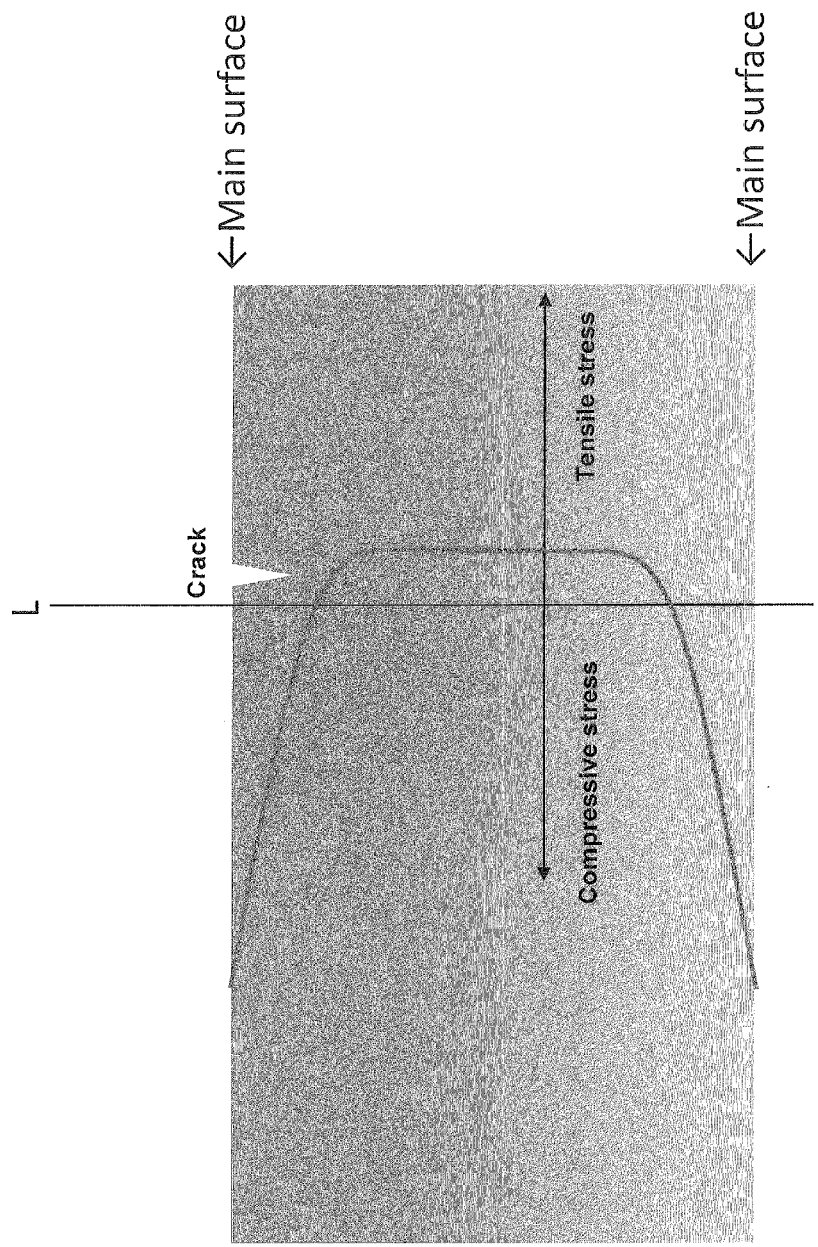
FIG. 1 is a schematic drawing of the stress profile in a chemically strengthened glass substrate.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

[Glass for a Magnetic Recording Medium Substrate]

The glass for a magnetic recording medium substrate according to an aspect of the present invention comprises essential components in the form of $SiO_2$, $Li_2O$, $Na_2O$, and one or more alkaline earth metal oxides selected from the group consisting of MgO, CaO, SrO, and BaO; wherein a molar ratio of a content of CaO to a combined content of MgO, CaO, SrO, and BaO (CaO/(MgO+CaO+SrO+BaO)) is equal to or less than 0.20; and which has a glass transition temperature of equal to or higher than 650° C.

The glass for a magnetic recording medium substrate according to an aspect of the present invention is oxide glass the glass composition of which is denoted based on oxides. An oxide-based glass composition is a glass composition that is obtained by conversion and assumes that the glass starting materials all break down during melting and are present as oxides in the glass. The glass is desirably amorphous (non-crystalline) because the amorphous glass requires no heat treatment step for crystallization and can achieve good processability.

The glass for a magnetic recording medium according to an aspect of the present invention is suitable to chemical strengthening. In the present invention, chemical strengthening means low-temperature chemical strengthening.

In the present invention, "main surfaces" means the surfaces of the greatest area among the surfaces of the glass substrate or glass. In the case of a disk-shaped glass substrate, the pair of surfaces corresponding to the round front and rear of the disk (excluding the center hole when present) corresponds to main surfaces.

Below, unless specifically stated otherwise, the content and combined content of glass components denote mole percent and the content ratios of glass components denote molar ratios.

$SiO_2$ is a glass network-forming component that has the effect of enhancing glass stability, chemical durability, and particularly, acid resistance. It is a component that serves to lower the thermal diffusion of the substrate and raise heating efficiency when heating the substrate by irradiation in the steps of forming films such as the magnetic recording layer on the glass substrate and when heat treating the films formed by such steps. In the glass for a magnetic recording medium substrate according to an aspect of the present invention, $SiO_2$ is an essential component. Since the incorporation of $SiO_2$ has the above effects, the $SiO_2$ content is desirably equal to or greater than 55 percent, preferably equal to or greater than 57 percent, more preferably equal to or greater than 60 percent, and still more preferably, equal to or greater than 63 percent. On the other hand, when the $SiO_2$ content becomes excessive, the $SiO_2$ does not melt fully, leaving unmelted material in the glass, and the viscosity of the glass during clarification becomes excessive, tending to result in inadequate elimination of bubbles. Thus, the $SiO_2$ content is desirably equal to or less than 78 percent, preferably equal to or less than 75 percent, more preferably equal to or less than 73 percent, and still more preferably, equal to or less than 69 percent.

$Li_2O$ is an essential component that has the effects of improving the melt properties and homogeneity of the glass, and increasing the thermal expansion coefficient of the glass and permitting chemical strengthening. As set forth further below, it is possible to soften the stress distribution that is formed by chemical strengthening by including $Na_2O$ along with it as a glass component. It also has the effect of preventing the delayed fracturing of the chemically strengthened glass, as set forth further below. However, an excessive $Li_2O$ content may cause the glass transition temperature to drop and tends to cause chemical durability to deteriorate. Thus, the $Li_2O$ content is desirably greater than 0 percent but equal to or less than 5 percent. The upper limit of the $Li_2O$ content is preferably 4 percent, more preferably 3.5 percent, and still more preferably, 3 percent. The lower limit of the $Li_2O$ content is desirably 0.1 percent, preferably 0.3 percent, and still more preferably, 0.5 percent.

$Na_2O$ is an essential component that has the effects of improving the melt properties and homogeneity of the glass, raising the thermal expansion coefficient, and permitting chemical strengthening. However, an excessive $Na_2O$ content may lower the glass transition temperature and tends to cause chemical durability to deteriorate. Thus, the $Na_2O$ content is desirably 2 to 15 percent. The upper limit of the $Na_2O$ content is preferably 14 percent, more preferably 12 percent, and still more preferably, 10 percent. The lower limit of the $Na_2O$ content is preferably 3 percent, more preferably 4 percent, and still more preferably, 5 percent.

When immersing a glass containing $Li_2O$ and $Na_2O$ in a mixed salt melt of sodium salt and potassium salt to chemically strengthen it, an ion exchange takes place between the $Li^+$ ions in the glass and the $Na^+$ ions in the salt melt, an ion exchange takes place between the $Na^+$ ions in the glass and the $K^+$ ions in the salt melt, a compressive stress layer forms in the vicinity of the surface, and a tensile stress layer forms within the glass.

The glass substrate for a magnetic recording medium according to an aspect of the present invention has a high glass transition temperature of equal to or greater than 650° C. and good heat resistance, and is suitable as a magnetic recording medium-use substrate material for forming a magnetic recording layer comprised of a high Ku magnetic material. In the high-temperature processing and the like of magnetic materials, the glass substrate is exposed to elevated temperatures. When a glass material with a high glass transition temperature such as that set forth above is employed, there is no loss of substrate flatness. From the perspective of providing a substrate material of high heat resistance, the lower limit of the glass transition temperature in the present invention is desirably 655° C., preferably 660° C., more preferably 665° C., still more preferably 670° C., and yet still more preferably, 675° C. However, when the glass transition temperature is excessive, the chemical strengthening processing temperature rises, the salt melt undergoes thermal decomposition during chemical strengthening, and the surface of the glass corrodes. Thus, the upper limit of the glass transition temperature is desirably 740° C. The glass transition temperature remains nearly unchanged before and after chemical strengthening.

Figure 2:
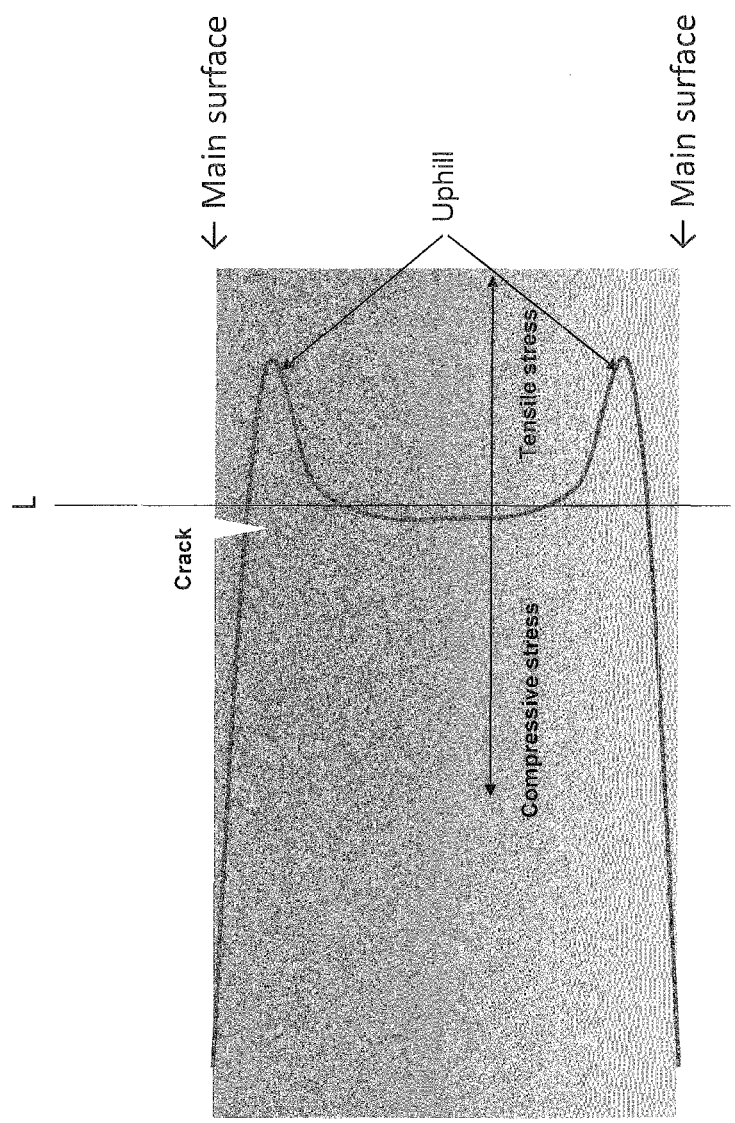
FIG. 2 is a schematic drawing of the stress profile in a chemically strengthened glass substrate.

The diffusion rate of the alkali metal ions in the glass increases as the ion radius decreases. Thus, the $Na^+$ ions in the salt melt penetrate to a deeper layer from the glass surface, forming a deep compressive stress layer. The $K^+$ ions in the salt melt do not penetrate to as deep a layer as the $Na^+$ ions, and form a compressive stress layer in a shallow portion from the surface. The stress distribution in the direction of depth of the glass that has been chemically strengthened by the mixed salts is comprised of a stress distribution formed by ion exchange between $Na^+$ and $Li^+$ and a stress distribution formed by ion exchange between $K^+$ and $Na^+$. Thus, the stress distribution in the direction of depth changes gradually. As shown in the schematic drawing of FIG. 1, in the stress profile in a virtual cross section perpendicular to the two main surfaces as measured by the Babinet method, the tensile stress distribution is convex in shape. This convex shape does not contain indentations that indent to the compressive stress side, as shown in FIG. 2, described further below. Further, a relative deep compressive stress layer is formed. In FIG. 1, there is a compressive stress region to the left of centerline L. The right side is the tensile stress region.

Even assuming that cracks open in the surface of the glass and reach the tensile stress layer, a chemically strengthened glass with the above stress distribution would not immediately fracture.

In contrast, when chemically strengthening a glass containing $Na_2O$ and not containing $Li_2O$, immersing the glass in a potassium salt melt and causing the $Na^+$ ions in the glass to exchange with the K ions in the salt melt would form a compressive stress layer in the vicinity of the glass surface. $K^+$ ions have a lower diffusion rate than $Na^+$ and $Li^+$ ions and do not reach the deep layers of the glass. The compressive strength layer would be shallow, the stress distribution in the direction of depth would change abruptly, and as shown in the schematic diagram of FIG. 2, the spots near the sides of the two main surfaces and away from the center portion of the main surfaces would present maxima in the stress profile in a virtual cross section perpendicular to the two main surfaces as measured by the Babinet method. That is, the tensile stress would be maximal in two spots. Such maxima are referred to as "uphills." In such a glass, if cracks were to form in the glass surface and reach the tensile stress layer, the ends of the cracks would reach the region of maximal tensile stress, and progression of the fractures would be exacerbated by the tensile stress, causing so-called "delayed fracturing."

In the glass for a magnetic recording medium substrate according to an aspect of the present invention, since $Li_2O$ and $Na_2O$ are contained as glass components, chemical strengthening by a mixed salt of $Na^+$ and $K^+$ can prevent delayed fracturing. From the perspective of even more effectively preventing delayed fracturing, the $Li_2O$ content is desirably equal to or greater than 0.1 mole percent.

The glass for a magnetic recording medium according to an aspect of the present invention contains one or more alkaline earth metal oxides from among MgO, CaO, SrO, and BaO. These alkaline earth metal oxides have the effects of improving the glass melt properties and increasing the thermal expansion coefficient.

By the way, when chemically strengthening glass with a high glass transition temperature of 650° C. or above, the strengthening treatment temperature also rises. When chemically strengthening glass with a high glass transition temperature, the drop in ion exchange efficiency that presents no problem in conventional glasses with relatively low glass transition temperatures becomes pronounced.

The present inventors conducted research on this point that resulted in the following discovery.

The ionic radii of the alkali metal ions $Li^+$, $Na^+$, and $K^+$ and the alkaline earth metal ions $Mg^{2+}$, $Ca^{2+}$, $Sr^{2+}$, and $Ba^{2+}$ according to Pauling are given in Table 1.

TABLE 1

| Alkali metal ion | Ionic radius | Alkaline earth metal ion | Ionic radius |
|---|---|---|---|
| $Li^+$ | 60 pm | $Mg^{2+}$ | 65 pm |
| $Na^+$ | 95 pm | $Ca^{2+}$ | 99 pm |
| $K^+$ | 133 pm | $Sr^{2+}$ | 113 pm |
|  |  | $Ba^{2+}$ | 135 pm |

As will be clear from Table 1, the ion radii of $Li^+$ and $Mg^{2+}$, $Na^+$ and $Ca^{2+}$, and $K^+$ and $Sr^{2+}$ have similar values. When the strengthening treatment temperature is raised, in addition to ion exchange between the alkali metal ions in the glass and in the salt melt, an ion exchange also takes place between the alkaline earth metal ions in the glass and the alkali metal ions in the salt melt. In particular, the rate of ion exchange between alkali metal ions and alkaline earth metal ions of similar ion radius values is thought to increase.

When employing a mixed salt melt of sodium salt and potassium salt to chemically strengthen a glass containing CaO, in parallel with the reaction $Na^+$ (glass)<=>$K^+$ (salt melt), the reaction $Ca^{2+}$ (glass)<=>$Na^+$ (salt melt) takes place and exchanges between alkali metal ions are thought to be impeded.

If a lithium salt melt is not employed, the $Mg^{2+}$ in the glass does not undergo the ion exchange of $Mg^{2+}$ (glass)<=>$Li^+$ (salt melt). Since the ion radius of $Sr^{2+}$ in the glass is large and its diffusion rate is slow, it tends not to exchange with $K^+$ in the salt melt.

Accordingly, in the present invention, the content of CaO, which is thought to impede ion exchange between alkali metal ions, is limited to eliminate the drop in mechanical strength that is thought to be caused by a specific drop in ion exchange efficiency in the chemical strengthening of glasses with high heat resistance. That is, the molar ratio of the content of CaO to the combined content of MgO, CaO, SrO, and BaO (CaO/(MgO+CaO+SrO+BaO)) is limited to equal to or less than 0.20 to eliminate this drop in mechanical strength. From the perspectives of maintaining ion exchange efficiency and mechanical strength, the upper limit of the molar ratio (CaO/(MgO+CaO+SrO+BaO)) is desirably 0.18, preferably 0.16, and more preferably, 0.15.

MgO, CaO, SrO, and BaO serve to enhance the stiffness of the glass, increase the thermal expansion coefficient, and improve the melt properties of the glass. However, their excessive introduction tends to compromise chemical durability.

Accordingly, the combined content of MgO, CaO, SrO, and BaO is desirably 10 to 25 percent. The upper limit of the combined content of MgO, CaO, SrO, and BaO is preferably 24 percent, more preferably 22 percent, and still more preferably, 20 percent. The lower limit of the combined content of MgO, CaO, SrO, and BaO is preferably 11 percent, more preferably 13 percent, and still more preferably, 15 percent.

MgO is a component that has a good effect in raising the Young's modulus and specific modulus of elasticity without increasing the specific gravity of the glass. It does not impede ion exchange between alkali metal ions during chemical strengthening the way CaO does. Accordingly, glasses containing MgO are desirable. The lower limit of the MgO content is desirably 8 percent, preferably 12 percent, and more preferably, 15 percent. The upper limit of the MgO content is desirably 25 percent, preferably 23 percent, and still more preferably, 20 percent. The desirable range of the MgO content can also be specified as the relation to the combined content of MgO, CaO, SrO, and BaO. Among MgO, CaO, SrO, and BaO, MgO serves to increase stiffness while inhibiting an increase in specific gravity, and does not impede ion exchange between alkali metal ions. Thus, the molar ratio of the MgO content to the combined content of MgO, CaO, SrO, and BaO (MgO/MgO+CaO+SrO+BaO)) is desirably kept to within a range of 0.5 to 1.0. The range of the molar ratio of (MgO/MgO+CaO+SrO+BaO)) is preferably 0.6 to 1.0, more preferably 0.7 to 1.0, still more preferably 0.8 to 1.0, and yet more preferably, 1.0.

CaO is a component the serves to increase the expansion coefficient, but is also thought to have an effect in impeding ion exchange between alkali metal ions as set forth above. The content thereof is thus desirably 0 to 5 percent, preferably 0 to 4 percent, and more preferably, 0 to 3 percent. It is also possible not to incorporate any CaO. In contrast to CaO, which impedes ion exchange between alkali metal ions and reduces the efficiency of chemical strengthening, $Na_2O$ serves to increase the mechanical strength of the glass by chemical strengthening. Thus, to achieve good mechanical strength by chemical strengthening, the molar ratio of the CaO content relative to the $Na_2O$ content ($CaO/Na_2O$) is desirably kept to within the range of 0 to 1.5, preferably within the range of 0 to 1, more preferably within the range of 0 to 0.5, and still more preferably, 0.

SrO is an expensive component relative to MgO and CaO that has the effect of increasing the specific gravity. The SrO content is desirably kept to 0 to 8 percent, preferably to 0 to 7 percent, more preferably to 0 to 5 percent, still more preferably to 0 to 3 percent, even more preferably to 0 to 1 percent, and yet still more preferably to 0 to 0.5 percent. It is also possible not to incorporate SrO.

BaO increases the specific gravity, lowers the Young's modulus, and decreases chemical durability. The BaO content is desirably kept to 0 to 8 percent, preferably to 0 to 7 percent, more preferably to 0 to 5 percent, still more preferably to 0 to 3 percent, even more preferably to 0 to 1 percent, and yet still more preferably, to 0 to 0.5 percent. It is also possible not to incorporate BaO.

As set forth above, among MgO, CaO, SrO, and BaO, SrO is an expensive component. Thus, when keeping down the SrO content, glasses affording good chemical strengthening efficiency that are highly resistant to heat can be specified by the molar ratio (CaO/(MgO+CaO+BaO)). From this perspective, the range of the molar ratio (CaO/(MgO+CaO+BaO)) is desirably 0 to 0.20, preferably 0 to 0.18, more preferably 0 to 0.16, and still more preferably, 0 to 0.15.

The glass for a magnetic recording medium substrate according to an aspect of the present invention can contain $K_2O$ as an optional component. However, when the content of $K_2O$ increases relative to the content of $Na_2O$, the rate of ion exchange with the mixed salt melt of sodium salt and potassium salt decreases. Thus, the molar ratio of the $K_2O$ content to the $Na_2O$ content ($K_2O/Na_2O$) is desirably kept to equal to or less than 1.0. The range of the molar ratio ($K_2O/Na_2O$) is preferably equal to or less than 0.7, more preferably equal to or less than 0.3, and still more preferably, equal to or less than 0.1. This ratio can also be made 0.

To increase recording density, it is necessary to decrease the distance between the magnetic head and the surface of the magnetic recording medium and impart reading and writing resolution. To that end, reduction in the height at which the head flies (reduction in the spacing between the magnetic head and the surface of the magnetic recording medium) has been progressing. As a result, the presence of even the slightest protrusions on the surface of the magnetic recording medium is no longer permitted. That is because even minute protrusions collide with the head, damage the head, and the like in low-flying recording and reproduction systems. Additionally, BaO reacts with carbonic acid gas in the atmosphere, producing $BaCO_3$, which adheres to the surface of the glass substrate. In addition, BaO modifies the glass surface (referred to as "burning"), and is thus a component that presents the risk of forming minute protrusions on the substrate surface. Accordingly, it is desirable to keep the BaO content to within the above-stated range. Glasses that do not contain BaO—that is, BaO-free glasses—are desirable. Being Ba-free is also desirable to reduce the burden on the environment.

To obtain a high glass transition temperature, from the perspective of the effect of mixing in alkaline earths, it is desirable to add just a single component from among the alkaline earth oxides instead of adding multiple alkaline earth metal oxides. When multiple such oxides are added, the ratio of the alkaline earth oxide that is present in the greatest quantity is desirably selected to be equal to or more than 70 percent, preferably equal to or more than 80 percent, more preferably equal to or more than 90 percent, and optimally, equal to or more than 95 percent, of the total quantity of alkaline earth metal oxides.

To improve heat resistance while maintaining the efficiency of chemical strengthening, the molar ratio of the combined content of $Li_2O$, $Na_2O$, and $K_2O$ to the combined content of MgO, CaO, SrO, and BaO (($Li_2O+Na_2O+K_2O$)/(MgO+CaO+SrO+BaO)) is desirably kept to equal to or less than 2.0, preferably to equal to or less than 1.7, more preferably to equal to or less than 1.5, still more preferably to equal to or less than 1.3, and yet still more preferably, to equal to or less than 1.0.

$Al_2O_3$ is an optional component that has the effects of enhancing stiffness and heat resistance and improving ion-exchange efficiency. To achieve these effects, the $Al_2O_3$ content is desirably kept to equal to or greater than 1 percent, preferably to equal to or greater than 2 percent, and more preferably, to equal to or greater than 4 percent. However, when the $Al_2O_3$ content becomes excessive, the glass tends to exhibit reduced resistance to devitrification (stability) and poor melt properties. Thus, the $Al_2O_3$ content is desirably kept to equal to or less than 12 percent, preferably equal to or less than 10 percent, and more preferably, equal to or less than 7 percent.

To maintain the melt properties of the glass and achieve good acid resistance in the glass, the molar ratio of the $Al_2O_3$ content to the $SiO_2$ content ($Al_2O_3/SiO_2$) is desirably kept to equal to or less than 0.178, preferably equal to or less than 0.175, and more preferably, equal to or less than 0.170.

Compared to other $Li_2O$ and $Na_2O$, $K_2O$ has a greater effect in reducing the fracture toughness value. $K_2O$ also serves to decrease the efficiency of the ion exchange $Na^+$ (glass)<=>$K^+$ (salt melt). Thus, the $K_2O$ content is desirably kept to equal to or lower than 7 percent, preferably equal to or lower than 5 percent, more preferably equal to or lower than 3 percent, still more preferably equal to or lower than 1 percent, and yet still more preferably, equal to or lower than 0.5 percent. It is also possible not to incorporate $K_2O$.

$ZrO_2$, $TiO_2$, $Y_2O_3$, $La_2O_3$, $Gd_2O_3$, $Nb_2O_5$, $Ta_2O_5$, and $HfO_2$ are components that increase stiffness and heat resistance. Thus, the incorporation of at least one from among them is desirable. However, the incorporation of an excessive quantity compromises the melt properties and thermal expansion characteristics of the glass. Accordingly, the combined content of $ZrO_2$, $TiO_2$, $Y_2O_3$, $La_2O_3$, $Gd_2O_3$, $Nb_2O_5$, $Ta_2O_5$, and $HfO_2$ is desirably kept to 0 to 10 percent.

To achieve the effects of introducing the above oxides, the lower limit of the combined content of $ZrO_2$, $TiO_2$, $Y_2O_3$, $La_2O_3$, $Gd_2O_3$, $Nb_2O_5$, $Ta_2O_5$, and $HfO_2$ is desirably 0.1 percent, preferably 0.3 percent, and still more preferably, 0.5 percent. From the perspective of maintaining melt properties and the thermal expansion coefficient, the upper limit of the combined content of $ZrO_2$, $TiO_2$, $Y_2O_3$, $La_2O_3$, $Gd_2O_3$, $Nb_2O_5$, $Ta_2O_5$, and $HfO_2$ is desirably 8 percent, preferably 6 percent, and more preferably, 4 percent.

$ZrO_2$ is an optional component that serves to raise the glass transition temperature and improve heat resistance, as well as to improve chemical durability, particularly resistance to alkalinity. It also has an effect of raising the Young's modulus to achieve high stiffness, and improving ion-exchange efficiency. Accordingly, the $ZrO_2$ content is desirably kept to equal to or greater than 0.1 percent, preferably equal to or greater than 0.3 percent, and still more preferably, equal to or greater than 0.5 percent. When an excessive amount of $ZrO_2$ is incorporated, glass melt properties deteriorate, starting materials tend not to fully melt, and there is a risk of rendering the production of a homogeneous glass difficult. Thus, the $ZrO_2$ content is desirably kept to equal to or less than 6 percent, preferably to equal to or less than 4 percent, and more preferably, to equal to or less than 3 percent.

The desirable range of the $ZrO_2$ content can also be specified using the combined content of $ZrO_2$, $TiO_2$, $Y_2O_3$, $La_2O_3$, $Gd_2O_3$, $Nb_2O_5$, $Ta_2O_5$, and $HfO_2$. Since $ZrO_2$ has the effect of enhancing ion-exchange efficiency, the molar ratio of the $ZrO_2$ content to the combined content of $ZrO_2$, $TiO_2$, $Y_2O_3$, $La_2O_3$, $Gd_2O_3$, $Nb_2O_5$, $Ta_2O_5$, and $HfO_2$ ($ZrO_2/(ZrO_2+TiO_2+Y_2O_3+La_2O_3+Gd_2O_3+Nb_2O_5+Ta_2O_5+HfO_2)$) is desirably kept to within a range of 0.3 to 1.0. The range of the molar ratio ($ZrO_2/(ZrO_2+TiO_2+Y_2O_3+La_2O_3+Gd_2O_3+Nb_2O_5+Ta_2O_5+HfO_2)$) is preferably 0.5 to 1.0, more preferably 0.7 to 1.0, and optimally, 1.0.

To enhance the chemical durability of the glass, the combined content of $SiO_2$, $ZrO_2$, $TiO_2$, $Y_2O_3$, $La_2O_3$, $Gd_2O_3$, $Yb_2O_3$, $Nb_2O_5$, $Ta_2O_5$, and $HfO_2$ is desirably kept to equal to or greater than 66 percent, preferably equal to or greater than 66.5 percent, and more preferably, equal to or greater than 67.0 percent. The upper limit of the combined content of $SiO_2$, $ZrO_2$, $TiO_2$, $Y_2O_3$, $La_2O_3$, $Gd_2O_3$, $Yb_2O_3$, $Nb_2O_5$, $Ta_2O_5$, and $HfO_2$ is determined by the various contents of $Al_2O_3$, alkali metal oxides, alkaline earth metal oxides, and other components.

When the glass for a magnetic recording medium substrate according to an aspect of the present invention contains $ZrO_2$, the combined content of $SiO_2$ and $ZrO_2$ is desirably kept to equal to or greater than 66 percent to improve the chemical durability of the glass. The lower limit of the combined content of $SiO_2$ and $ZrO_2$ is preferably 66.5 percent and more preferably, 67.0 percent. The upper limit of the combined content of $SiO_2$ and $ZrO_2$ is determined by the various contents of $Al_2O_3$, alkali metal oxides, alkaline earth metal oxides, and other components.

$TiO_2$ is a component that inhibits an increase in specific gravity more, and has a greater effect on raising Young's modulus and the specific modulus of elasticity than, $ZrO_2$, $Y_2O_3$, $La_2O_3$, $Gd_2O_3$, $Nb_2O_5$, $Ta_2O_5$, and $HfO_2$. However, the incorporation of an excessive quantity may cause reaction products with water to adhere to the glass surface when the glass is immersed in water, resulting in losing the smoothness of the glass surface. Thus, the $TiO_2$ content is desirably 0 to 5 percent, preferably 0 to 4 percent, and more preferably, 0 to 3 percent. The non-incorporation of $TiO_2$ is still more preferable.

$La_2O_3$, $Gd_2O_3$, $Nb_2O_5$, $Y_2O_3$, $Ta_2O_5$, and $HfO_2$ are components that increase the specific gravity. Each of these components is thus desirably incorporated in a content of 0 to 7 percent, preferably 0 to 6 percent, and more preferably, 0 to 5 percent. It is also possible not to incorporate any of these components.

$B_2O_3$ is a component that improves the brittleness of the glass substrate and enhances the melt properties of the glass. However, incorporation in an excessive quantity lowers heat resistance. Thus, in the various above glasses, the quantity incorporated is desirably 0 to 3 mol percent, preferably 0 to 2 mol percent, more preferably equal to or more than 0 mol percent to less than 1 mol percent, still more preferably 0 to 0.5 mol percent, yet more preferably 0 to 0.3 mol percent, and yet still more preferably, 0 to 0.1 mol percent. It is also possible to incorporate substantially none.

ZnO improves the melt properties, moldability, and stability of the glass, increases stiffness, and raises the thermal expansion coefficient. However, excessive incorporation greatly lowers the glass transition temperature, markedly reduces heat resistance, and compromises chemical durability. Thus, the content of ZnO is desirably 0 to 10 percent. The range of the ZnO content is preferably 0 to 7 percent and more preferably, 0 to 5 percent. It is also possible to incorporate no ZnO.

It is desirable not to incorporate Pb, As, Cd, U, Th, or the like out of concern for the effect on the environment.

(Additives)

In addition to the above glass components, Sn oxides, Ce oxides, $Sb_2O_3$, Fe, Cl, and other halides can be added in small amounts as clarifying agents. Of these, Sn oxides and Ce oxides are desirably employed as clarifying agents. The reasons for this are given below.

At elevated temperature during melting of the glass, Sn oxides tend to release oxygen gas. Minute bubbles that are contained in the glass are picked up and converted into large bubble, which tend to rise, thereby achieving a good clarifying action. Additionally, Ce oxides pick up as a glass component oxygen that is present as a gas in the glass at low temperature, thereby achieving a good clarifying action. At a bubble size of equal to or less than 0.3 mm (the size of bubbles (voids) remaining in the solidified glass), the action of Sn oxides in eliminating both relatively large bubbles and extremely small bubbles is powerful. When a Ce oxide is added in combination with an Sn oxide, the density of bubbles of about 50 µm to 0.3 mm in size is reduced to about one part in several tens. Thus, by combining an Sn oxide and a Ce oxide, it is possible to increase the glass clarifying effect over a broad temperature range from the high temperature range to the low temperature range. It is for that reason that the addition of an Sn oxide and a Ce oxide is desirable.

When the total quantity of Sn oxide and Ce oxide that is added relative to the total of the other components is equal to or greater than 0.02 mass percent, an adequate clarifying effect can be anticipated. When a substrate is prepared using glass containing even trace or small quantities of unmelted material, and the unmelted material appears on the surface of the substrate due to polishing, protrusions are generated on the substrate surface and portions where the unreacted material drops out become pits. The smoothness of the substrate surface is lost, and the substrate cannot be used in a magnetic recording medium. By contrast, when the total quantity of Sn oxide and Ce oxide added relative to the total of the other components is equal to or less than 3.5 mass percent, they can dissolve adequately into the glass and prevent the incorporation of unmelted material.

When preparing crystallized glass, Sn and Ce function to produce crystal nuclei. Since the glass according to an aspect of the present invention is amorphous glass, it is desirable not to cause crystals to precipitate by heating. When the quantities of Sn and Ce are excessive, such precipitation of crystals tends to occur. Thus, the addition of an excessive quantity of Sn oxide or Ce oxide is to be avoided.

From the above perspectives, the total quantity of Sn oxide and Ce oxide added relative to the total of the other components is desirably 0.02 to 3.5 mass percent. The total quantity of Sn oxide and Ce oxide added relative to the total of the other components preferably falls within a range of 0.1 to 2.5 mass percent, more preferably a range of 0.1 to 1.5 mass percent, and still more preferably, within a range of 0.5 to 1.5 mass percent.

The use of $SnO_2$ as the Sn oxide is desirable to effectively release oxygen gas from the glass melt at high temperature. The quantities of Sn oxides and Ce oxides that are added can be adjusted to achieve an adequate clarifying property without adding $Sb_2O_3$.

Sulfates can also be added as clarifying agents in a range of 0 to 1 mass percent relative to the total of the other components. However, they present the risk that melted material will boil over in the glass melt, causing foreign matter to increase sharply in the glass. When this boiling over is a concern, it is desirable not to incorporate sulfates. So long as the object of the present invention is not lost and a clarifying effect is achieved, clarifying agents other than those set forth above can be employed. However, the addition of As is to be avoided due to the great environmental burden it creates, as set forth above.

$Sb_2O_3$ can be employed alone as a clarifying agent, employed in combination with a Sn oxide or Ce oxide, or employed in combination with an Sn oxide and Ce oxide.

The various characteristics of the glasses or glass substrates of an aspect of the present invention will be described next below.

(Thermal Expansion Coefficient)

Hard disk drives (HDDs) in which magnetic recording media are incorporated have a structure wherein the center portion is pressed by a clamp and the spindle of a spindle motor, and the magnetic recording medium itself is rotated. Thus, when there is a large difference in the thermal expansion coefficients of the magnetic recording medium substrate and the spindle material constituting the spindle member, differential results from the thermal expansion and contraction of the magnetic recording medium substrate and the thermal expansion and contraction of the spindle relative to changes in the ambient temperature during use. As a result, a phenomenon occurs whereby the magnetic recording medium ends up deforming. When this phenomenon occurs, the head becomes unable to read information that has been written, compromising the reliability of reading and writing. Accordingly, to increase the reliability of the magnetic recording medium, there is a need for a glass having a thermal expansion coefficient that is as close as possible to the thermal expansion coefficient of the spindle material (for example, stainless steel) in the substrate material. In particular, in magnetic recording media having a magnetic recording layer comprised of a high Ku magnetic material, an extremely high recording density will tend to cause the above problem to occur due to just slight deformation of the magnetic recording medium.

In a desirable embodiment of the glass for a magnetic recording medium substrate according to an aspect of the present invention, the average coefficient of linear expansion over the temperature range of 100 to 300° C. is $50\times10^{-7}/°$ C. It is possible to increase the reliability in the HDD by fabricating a substrate using this glass. Thus, it is possible to provide a substrate material that is suited to a magnetic recording medium having a magnetic recording layer comprised of a high Ku magnetic material. The range of the average coefficient of linear expansion is preferably equal to or greater than $55\times10^{-7}/°$ C., more preferably equal to or greater than $60\times10^{-7}/°$ C. When the thermal expansion characteristics of the spindle material are taken into account, the upper limit of the average coefficient of linear expansion is desirably about $120\times10^{-7}/°$ C., for example; and preferably $100\times10^{-7}1°$ C. The thermal expansion coefficient is a value that remains nearly constant before and after chemical strengthening.

The average coefficient of linear expansion over the temperature range of 500 to 600° C. is desirably $60\times10^{-7}/°$ C. and above, preferably $70\times10^{-7}/°$ C. and above. The average coefficient of linear expansion over the temperature range of 500 to 600° C. is desirably equal to or lower than $100\times10^{-7}1°$ C., for example; and preferably equal to or lower than $90\times10^{-7}1°$ C. By fabricating a substrate using a glass with an average coefficient of linear expansion over the temperature range of 500 to 600° C. falling within the above range, in the course of conducting annealing after forming a multilayer film of a high Ku magnetic material or the like, it is possible to reliably prevent the multilayer film from separating from the glass substrate during or after the annealing process, and to prevent the substrate from falling off the support material during annealing.

(Young's Modulus)

In disk-shaped magnetic recording media, data are written and read in a rotational direction while displacing a magnetic head radially while rotating the medium rapidly about a center axis. In recent years, the rate of rotation has risen from 5,000 rpm to 7,200 rpm to increase the speed of reading and writing, and is advancing in the direction of the even higher speed of 10,000 rpm. However, in disk-shaped magnetic recording media, the positions where data are recorded are allocated based on the distance from the center axis. Thus, when the disk deforms during rotation, the position of the magnetic head shifts, and accurate reading becomes difficult. Accordingly, in responding to the above higher speed rotation, there is a requirement that the glass substrate have a high stiffness (Young's modulus) such that great deformation does not occur during high-speed rotation. One desirable embodiment of the glass for a magnetic recording medium substrate according to an aspect of the present invention has a Young's modulus of equal to or greater than 75 GPa. Thus, by fabricating a substrate using this glass, it is possible to inhibit substrate deformation during high-speed rotation and accurately read and write data even in a magnetic recording medium that has been adapted to high recording densities by equipping it with a high Ku magnetic material. The range of the Young's modulus is preferably equal to or greater than 78 GPa, more preferably equal to or greater than 80 GPa, and still more preferably, equal to or greater than 82 GPa. The upper limit of the Young's modulus is not specifically limited. However, bring other characteristics into desired ranges, an upper limit of 90 GPa, for example, can serve as a yardstick. Young's modulus is also a value that remains nearly constant before and after chemical strengthening.

(Specific Modulus of Elasticity and Specific Gravity)

To inhibit deformation (substrate bending) of the magnetic recording medium during high-speed rotation, a glass having a high specific modulus of elasticity is desirable as the substrate material. The specific modulus is also a value that remains nearly constant before and after chemical strengthening. The range of the specific modulus of elasticity in the glass for a magnetic recording medium substrate according to an aspect of the present invention is desirably equal to or greater than 25 MNm/kg, preferably equal to or greater than 27 MNm/kg, and more preferably, equal to or greater than 30 MNm/kg. The upper limit is about 37 MNm/kg, for example, but is not specifically limited. The specific modulus of elasticity is obtained by dividing the Young's modulus of the glass by the density. In this context, the "density" can be thought of as a quantity in units of $g/cm^3$ applied to the specific gravity of the glass. The specific modulus of elasticity can be increased by lowering the specific gravity of the glass, as well as by reducing the weight of the substrate. The weight of the magnetic recording medium is reduced by reducing the weight of the substrate, thereby reducing the power that is required to rotate the magnetic recording medium and keeping down the power consumption of the HDD. The range of the specific gravity of the glass for a magnetic recording medium substrate according to an aspect of the present invention is desirably equal to or lower than 2.9, preferably equal to or lower than 2.8, and more preferably, equal to or lower than 2.7. The specific gravity is also a value that remains nearly constant before and after chemical strengthening.

(Acid Resistance and Alkali Resistance)

In the course of producing a magnetic recording medium-use glass substrate, the glass is processed into a disk shape, and the main surfaces are processed to be extremely flat and smooth. Following these processing steps, the glass substrate is normally washed with an acid to remove organic material in the form of grime that has adhered to the surfaces. When the glass substrate has poor acid resistance, the surface is roughened during the acid washing, flatness and smoothness are lost, and use as a magnetic recording medium-use glass substrate becomes difficult. It is particularly desirable to employ a glass having good acid resistance as the material of a magnetic recording medium-use glass substrate that has been adapted to high recording density and has a magnetic recording layer comprised of a high Ku magnetic material and glass substrate surfaces that are required to be highly flat and smooth.

Following the acid washing, alkali washing can be conducted to remove foreign material, such as an abrasive, that has adhered to the surface and obtain a substrate in an even cleaner state. During alkali washing, as well, a glass with good alkali resistance is desirable as a material for a glass substrate to prevent a decrease in the flatness and smoothness of the substrate surfaces due to roughening of the surfaces. Having good acid resistance and alkali resistance and highly flat and smooth substrate surfaces is advantageous from the perspective of permitting a low-flying magnetic head. In the present invention, it is possible to achieve good acid resistance and alkali resistance by adjusting the glass composition set forth above, and in particular, advantageously adjusting the composition to achieve chemical durability.

(Liquidus Temperature)

In the course of melting the glass and molding the glass melt that is obtained, the glass crystallizes if the molding temperature is lower than the liquidus temperature, precluding the obtaining of a homogeneous glass. Thus, the glass molding temperature must be greater than or equal to the liquidus temperature. However, when the molding temperature exceeds 1,450° C., the pressing mold that is used in the course of press molding a glass melt, for example, will react with the high temperature glass and tend to be damaged. When casting a glass melt into a casting mold and molding it, the mold similarly tends to be damaged. Taking this point into account, it is desirable for the liquidus temperature of the glass constituting the glass substrate according to an aspect of the present invention to be equal to or lower than 1,450° C. The range of the liquidus temperature is preferably equal to or lower than 1,430° C., and more preferably, equal to or lower than 1,400° C. In the present invention, it is possible to adjust the glass composition set forth above to achieve a liquidus temperature within the above desirable range. The lower limit is not specifically defined; equal to or higher than 800° C. can be considered a yardstick.

(Spectral Transmittance)

A magnetic recording medium is produced by a process of forming a multilayered film comprising a magnetic recording layer on a glass substrate. In the course of forming a multilayered film on a glass substrate by the single substrate film forming method that is currently the mainstream, for example, the glass substrate is first introduced into the glass substrate heating region of a film-forming device and heated to a temperature at which film formation by sputtering or the like is possible. Once the temperature of the glass substrate has risen adequately, the glass substrate is moved to a first film-forming region where a film corresponding to the lowest layer of the multilayer film is formed on the glass substrate. Next, the glass substrate is moved to a second film-forming region where a film is formed over the lowermost layer. The multilayered film is thus formed by sequentially moving the glass substrate to subsequent film-forming regions and forming films. Since the heating and film formation are conducted under reduced pressure achieved by evacuation with a vacuum pump, heating of the glass substrate must be conducted by a non-contact method. Thus, the glass substrate is suitably heated by radiation. This film formation must be conducted while the glass substrate is not at a temperature that is lower than the temperature suited to film formation. When the time required for forming each layer of the film is excessively long, the temperature of the glass substrate that has been heated drops, and there is a problem in that it is impossible to achieve an adequate glass substrate temperature in subsequent film-forming regions. To maintain the glass substrate at a temperature permitting film formation for an extended period, heating the glass substrate to a higher temperature is conceivable. However, when the heating rate of the glass substrate is low, the heating period must be extended, and the time during which the glass substrate remains in the heating region must be increased. Thus, the residence time of the glass substrate in each film-forming region increases, and an adequate glass substrate temperature ends up not being maintained in subsequent film-forming regions. Further, it becomes difficult to increase throughput. In particular, when producing a magnetic recording medium comprising a magnetic recording layer comprised of a magnetic material of high Ku, it is desirable to further increase the efficiency of heating the glass substrate with radiation so as to heat the substrate to a high temperature within a prescribed period.

In the above glass, absorption peaks may be present in the region containing the wavelengths of 2,750 to 3,700 nm. The absorption of radiation at short wavelengths can be increased by adding an infrared-absorbing agent, described further below, or by incorporating it as a glass component, thereby imparting absorption in the wavelength range of wavelengths of 700 to 3,700 nm. The use of infrared radiation having a spectral maximum in the above wavelength range is desirable to efficiently heat the glass substrate with radiation, that is, by irradiation with infrared radiation. It is conceivable to increase the power of the infrared radiation while matching the maximum spectral wavelength of the infrared radiation with the peak absorption wavelength of the substrate. Taking the example of a high-temperature carbon heater as an infrared source, it suffices to increase the input to the carbon heater to increase the power of the infrared radiation. However, considering the radiation from the carbon heater as black body radiation, an increase in the input increases the heater temperature. This shifts the maximum wavelength of the infrared radiation spectrum to the short wavelength side, ending up outside the absorption wavelength region of the glass. Thus, the powder consumption of the heater must be made excessively high to increase the heating rate of the substrate, creating a problem by shortening the service lifetime of the heater or the like.

In light of such problems, increasing the absorption of the glass in the above wavelength region (wavelengths 700 to 3,700 nm), irradiating infrared radiation with the maximum spectral wavelength of the infrared radiation in a state of proximity to the peak absorption wavelength of the substrate, and not employing an excessive heater input are desirable. Accordingly, to increase the infrared radiation heating efficiency, either the presence of a region in which the spectral transmittance as converted to a thickness of 2 mm is equal to or less than 50 percent in the 700 to 3,700 nm wavelength region in the glass for a magnetic recording medium substrate, or a glass with transmittance characteristics such that the spectral transmission as converted to a thickness of 2 mm is equal to or less than 70 percent over the above wavelength region is desirable. For example, the oxide of at least one metal selected from the group consisting of iron, copper, cobalt, ytterbium, manganese, neodymium, praseodymium, niobium, cerium, vanadium, chromium, nickel, molybdenum, holmium, and erbium can function as an infrared-absorbing agent. Further, water or OH groups contained in water absorb strongly in the 3 μm band, so water can also function as an infrared-absorbing agent. Incorporating a suitable quantity of a component that is capable of functioning as the above infrared-absorbing agent into the glass composition can impart the above desirable absorption characteristic to the glass substrate. The quantity added of the oxide that is capable of functioning as the infrared-absorbing agent is desirably 500 ppm to 5 percent, preferably 2,000 ppm to 5 percent, more preferably 2000 ppm to 2 percent, and still more preferably, falls within a range of 4,000 ppm to 2 percent based on the mass as the oxide. For water, the incorporation of more than 200 ppm is desirable, and the incorporation of equal to or more than 220 ppm is preferred, based on weight as converted to $H_2O$.

When employing $Yb_2O_3$ and $Nb_2O_5$ as glass components, and when adding Ce oxide as a clarifying agent, infrared absorption by these components can be used to enhance substrate heating efficiency.

(Method of Manufacturing the Glass)

The glass for a magnetic recording medium substrate according to an aspect of the present invention can be obtained, for example, by weighing out starting materials such as oxides, carbonates, nitrates, and hydroxides in a manner calculated to yield the above composition; mixing the starting materials to obtain a blended starting material; charging the blended starting material to a melting vessel and heating it to within a range of 1,400 to 1,600° C.; melting, clarifying, and stirring it to prepare a homogeneous glass melt containing no bubbles or unmelted material; and molding the glass melt. The glass melt can be molded using the press molding method, casting method, floating method, overflow down-draw method, or the like. For reasons given further below, use of the press molding method is particularly desirable to mold the glass melt.

(Chemically Strengthened Glass)

The glass for a magnetic recording medium substrate according to an aspect of the present invention is suitable as glass for chemical strengthening.

Since good chemical strengthening performance is imparted by adjusting the above composition, an ion-exchange layer can be readily formed in the glass surface by chemical strengthening processing. It is possible to form an ion-exchange layer over part or all of the surface. The ion-exchange layer can be formed by contacting the surface of the substrate with an alkali salt at an elevated temperature and causing the alkali metal ions in the substrate to exchange with the alkali metal ions in the alkali salt.

In the usual ion exchange, an alkali nitrate is heated to obtain a salt melt, and the substrate is immersed in the salt melt. When the alkali metal ions with small ion radii in the substrate are replaced with the alkali metal ions of larger ion radii in the salt melt, a compressive stress layer is formed in the surface of the substrate. That increases the fracture toughness of the magnetic recording medium-use glass substrate, making it possible to increase reliability.

Chemical strengthening can be conducted by immersing the glass, that may be preprocessed as needed, in a mixed salt melt containing, for example, a sodium salt and a potassium salt. Sodium nitrate is desirably employed as the sodium salt and potassium nitrate as the potassium salt. The glass for a magnetic recording medium substrate according to an aspect of the present invention contains $Li_2O$ as an essential component as set forth above, so the ion exchange is desirably conducted with Na and K, which have large ion radii than Li.

The quantity of alkali leaching out of the chemically strengthened glass surface can also be reduced by ion exchange. In the case of chemical strengthening, the ion exchange is desirably conducted within a temperature range that is higher than the strain point of the glass constituting the substrate, lower than the glass transition temperature, and in which the alkali salt melt does not undergo thermal decomposition. The fact that an ion-exchange layer is present in the substrate can be confirmed by the method of observing a cross section of the glass (a plane cutting through the ion-exchange layer) by the Babinet method, by the method of measuring the concentration distribution in the direction of depth of the alkali metal ions from the surface of the glass, and the like.

The strengthening treatment temperature (temperature of the salt melt) and the strengthening processing time (the time during which the glass is immersed in the salt melt) can be suitably adjusted. For example, the range of the strengthening treatment temperature can be adjusted with 400 to 570° C. as a goal. The range of the strengthening processing time can be adjusted with 0.5 to 10 hours as a goal, desirably with 1 to 6 hours as a goal.

Since the glass transition temperature, thermal expansion coefficient, Young's modulus, specific modulus of elasticity, specific gravity, and spectral transmittance are values that remain nearly constant before and after chemical strengthening, the various characteristics of the thermal expansion coefficient, Young's modulus, specific modulus od elasticity, specific gravity, and spectral transmittance before and after chemical strengthening are treated as identical values in the present invention. The glass in an amorphous state maintains an amorphous state after chemical strengthening.

[Glass Substrate for Magnetic Recording Medium]

The first embodiment of the glass substrate for a magnetic recording medium according to an aspect of the present invention (referred to as glass substrate I, hereinafter) is a glass substrate obtained by chemically strengthening the glass for a magnetic recording medium substrate of the present invention that is set forth above.

The glass for a magnetic recording medium substrate according to an aspect of the present invention can exhibit the above-described stress profile due to chemical strengthening, thereby preventing the generation of delayed fracturing. Accordingly, glass substrate I can be a glass substrate that does not develop delayed fractures and has high heat resistance and good mechanical strength, as well as can exhibits various advantages that are possessed by the glass obtained by chemically strengthening the above glass for a magnetic recording medium substrate.

The second embodiment of the glass substrate for a magnetic recording medium according to an aspect of the present invention (referred to as glass substrate II, hereinafter) is a glass substrate comprised of a chemically strengthened glass having a glass transition temperature of equal to or higher than 650° C. in which a tensile stress distribution is convex in shape such that the convex shape does not contain indentations indenting to a compressive stress side in a stress profile in a virtual cross section perpendicular to two main surfaces as obtained by the Babinet method. The stress profile is as set forth above. By exhibiting such a stress profile, it is possible to prevent the generation of delayed fractures. For example, when the depth from the main surface is denoted by x in the virtual cross section, the stress value S(x) at depth x is called the stress profile. The stress profile is normally linearly symmetric at the center between the two main surfaces. To determine the stress profile, it suffices to fracture the glass substrate perpendicularly to the two main surfaces and observe the fracture plane by the Babinet method.

As an example of a desirable stress profile of glass substrate II, the compressive stress value becomes a maximum in the vicinity of the two main surfaces, and the compressive stress value decreases as depth x increases. At depths beyond depth $x_0$, which is where the compressive stress and the tensile stress balance out, the compressive stress turns into tensile stress, and the tensile stress gradually increases, reaching a peak value at or in the vicinity of the midpoint between the two main surfaces. As shown in FIG. 1, the peak value will sometimes be maintained over a fixed region in the direction of depth. In a glass substrate that adopts such a stress profile, even if the depth of a crack that occurs on the substrate surface were to exceed $x_0$, it would be possible to prevent delayed fracturing where tensile stress causes the crack to grow rapidly to where fracturing occurs.

The third embodiment of the glass substrate for a magnetic recording medium according to an aspect of the present invention (referred to as glass substrate III, hereinafter) is a glass substrate comprised of a chemically strengthened glass having a glass transition temperature of equal to or higher than 650° C. in which an average value Tav of a tensile stress obtained by the Babinet method and a maximum value Tmax of the tensile stress satisfy the following equation (1):

$Tav/Tmax \geq 0.5$.

Equation (1) will be described below based on Figs. and 4.

Figure 3:
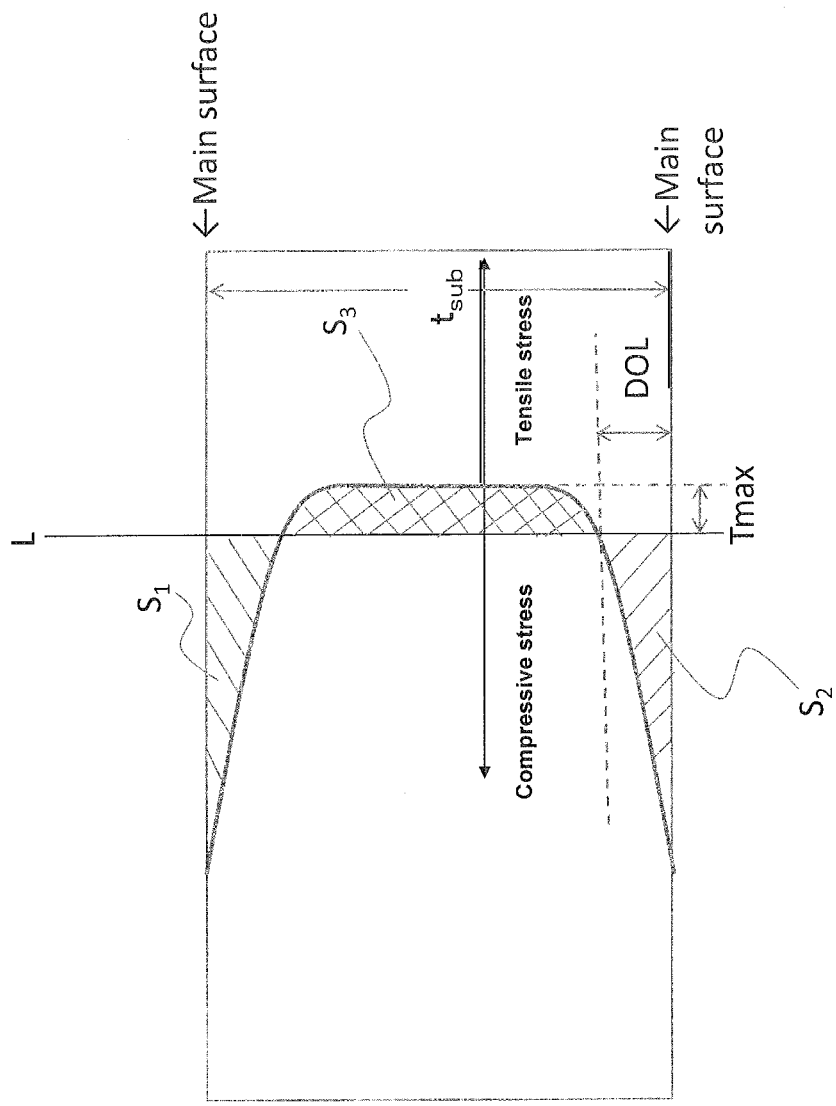
FIG. 3 is a descriptive drawing of equation (1)
Figure 4:
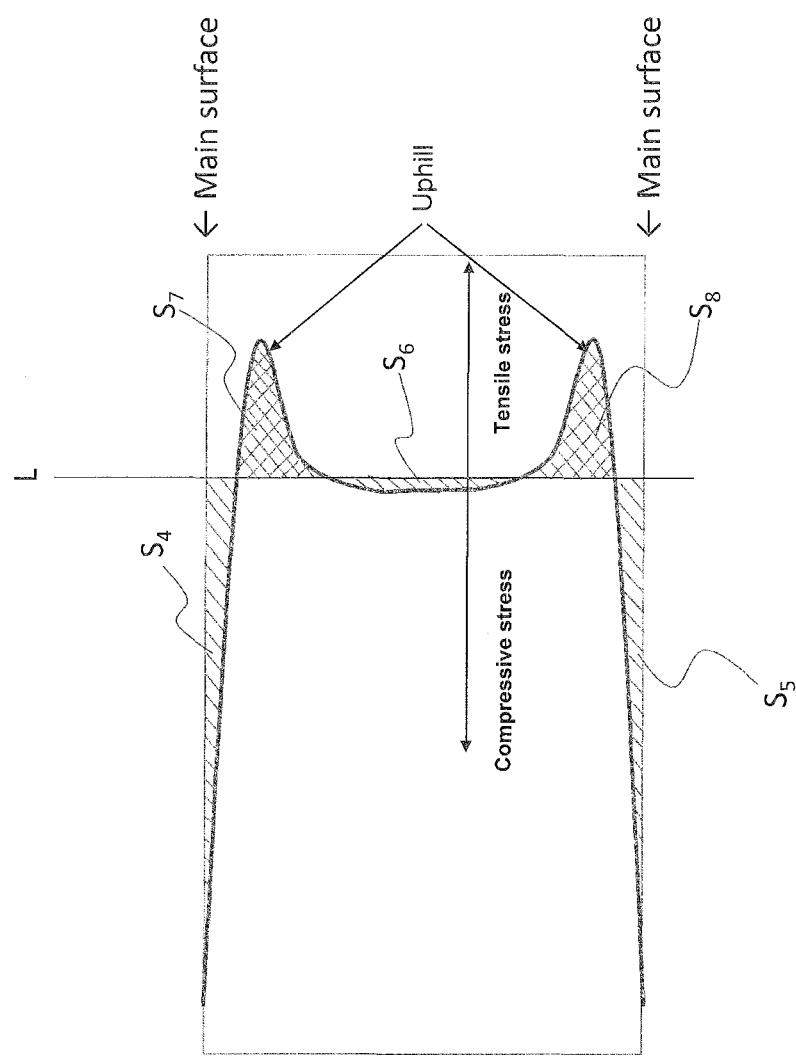
FIG. 4 is a descriptive drawing of equation (1)

Maximum value Tmax of the tensile stress is the peak value of the above tensile stress. In FIG. 3, line L—the centerline of the tensile stress and the compressive stress—is determined such that surface areas $S_1$, $S_2$, and $S_3$ satisfy $S_1+S_2=S_3$. Denoting the distance from the point of intersection of a virtual straight line parallel to the main surface on the $S_2$ side and a virtual line perpendicular to the two main surfaces and passing through Tmax to the main surface on the $S_2$ side as DOL, the average value Tav of the tensile stress is given by $Tav=S_3/(tsub-2\times DOL)$.

In glass III, $Tav/Tmax \geq 0.5$, it is desirable that $Tav/Tmax \geq 0.7$, and it is preferable that $Tav/Tmax \geq 0.8$. The upper limit of Tav/Tmax can be, for example, $Tav/Tmax<1.0$.

Tav/Tmax, specified by equation (1), can be employed as an indicator that no uphill, such as that shown in FIG. 2 and described above, is present. A glass substrate in which an uphill is present will have a large Tmax, making Tav/Tmax<0.5. By contrast, no uphill will be present in a glass satisfying equation (1), so the generation of delayed fractures will be inhibited.

As shown in FIG. 2, in a glass substrate in which uphills are present, line L will be determined such that surface areas $S_4$, $S_5$, $S_6$, $S_7$, and $S_8$ satisfy $S_4+S_5+S_6=S_7+S_8$. Tav is then calculated as $Tav=(S_7+S_8-S_6)/(tsub-2\times DOL)$. In FIG. 2, the tensile stress layer is divided into the two layers of $S_7$ and $S_8$ by $S_6$. As shown in FIG. 1, when the tensile stress layer is comprised of a single layer, Tav can be calculated as $Tav=S_3/(tsub-2\times DOL)$, as set forth above.

Further, glass substrates II and III have high glass transition temperatures of equal to or higher than 650° C. Thus, even when a high Ku magnetic material is formed on the substrate and a heat treatment is conducted, the substrate does not lose its flatness. This also applies to glass substrate I obtained by chemically strengthening a glass having a glass transition temperature of equal to or higher than 650° C.

In this manner, glass substrates I, II, and III are suited to applications requiring high reliability and good heat resistance, such as a substrate for a magnetic recording medium corresponding to high recording densities.

A preferred embodiment of the glass substrate of an aspect of the present invention is glass substrate I that is also glass substrate II or glass substrate III. An embodiment of greater preference is glass substrate I that is also glass substrate II and glass substrate III. Glass substrates II and III are desirably chemically strengthened glass substrates.

Examples of desirable embodiments are:

glass substrate I, comprised of a chemically strengthened glass in which a tensile stress distribution is convex in shape such that the convex shape does not contain indentations indenting to a compressive stress side in a stress profile in a virtual cross section perpendicular to two main surfaces as obtained by the Babinet method;

glass substrate I, comprised of a chemically strengthened glass in which an average value Tav of a tensile stress obtained by the Babinet method and a maximum value Tmax of the tensile stress satisfy the following equation (1):

$Tav/Tmax \geq 0.5$; and glass substrate I, comprised of a chemically strengthened glass in which a tensile stress distribution is convex in shape such that the convex shape does not contain indentations indenting to a compressive stress side in a stress profile in a virtual cross section perpendicular to two main surfaces as obtained by the Babinet method, and an average value Tav of a tensile stress and a maximum value Tmax of the tensile stress satisfy the following equation (1):

$Tav/Tmax \geq 0.5$.

The glass substrate according to an aspect of the present invention permits a reduction in the alkali leaching out of the substrate surface, so the glass substrate according to an aspect of the present invention is suitable as a glass substrate for a magnetic recording medium.

The common points of glass substrates I, II, and III will be described below.

(Fracture Toughness Value)

A desirable embodiment of the glass substrate according to an aspect of the present invention is a glass substrate in which fracture toughness value $K_{1c}$ is equal to or greater than 0.8 MPa·m$^{1/2}$, desirably equal to or greater than 1.0 MPa·m$^{1/2}$, preferably equal to or greater than 1.1 MPa·m$^{1/2}$, more preferably equal to or greater than 1.2 MPa·m$^{1/2}$, still more preferably equal to or greater than 1.3 MPa·m$^{1/2}$, yet more preferably equal to or greater than 1.4 MPa·m$^{1/2}$, yet still more preferably equal to or greater than 1.5 MPa·m$^{1/2}$, and optimally, equal to or greater than 1.6 MPa·m$^{1/2}$. As set forth above, with the increase in recording density of magnetic recording media, the rotational speed of the medium has increased and the distance between the magnetic head and the medium has increasingly tended to diminish. So that impacted substrates where the magnetic head comes into contact with the magnetic recording medium during rapid rotation are not damaged, a substrate with good impact resistance is considered necessary. Since the above substrate has a large fracture toughness value, it has good impact resistance and is suitable as a glass substrate for a magnetic recording medium adapted to high recording densities.

The fracture toughness value is measured by the following method.

Employing an MVK-E device made by Akashi, a Vickers indenter is pressed with an indentation load P [N] into a sample that had been processed into a plate, introducing an indentation and a crack into the sample. Denoting the Young's modulus of the sample as E [GPa], the indentation diagonal length as d [m], and the half length of the surface crack as a [m], the fracture toughness value $K_{1c}$ [Pa·m$^{1/2}$] is given by the following equation:

$$K_{1c}=[0.026(EP/\pi)^{1/2}(d/2)(a)^{-2}]/[(\pi a)^{-1/2}]$$

Unless specifically stated otherwise, the fracture toughness value in the present invention means the facture toughness value measured for a load P of 9.81 N (1,000 gf). The fracture toughness value can be measured in a smooth surface of the glass, such as a polished surface, for the purpose of accurately measuring the indentation diagonal length d and half length of the surface crack a. The fracture toughness value varies with the composition of the glass and with the chemical strengthening conditions. Thus, in obtaining the glass substrate for a magnetic recording medium according to an aspect of the present invention comprised of chemically strengthened glass, the fracture toughness value can be kept within a desired range by adjusting the composition and the chemical strengthening processing conditions.

(Surface Condition)

The main surface on which the magnetic recording layer is formed desirably has one or more of surface properties (1) to (3) below:

(1) An arithmetic average Ra of surface roughness measured at a resolution of 512×256 pixels over an area of 1 μm×1 μm by an atomic force microscope of equal to or lower than 0.15 nm;

(2) An arithmetic average Ra of surface roughness measured over an area of 5 μm×5 μm by an atomic force microscope of equal to or lower than 0.12 nm; or (3) An arithmetic average Wa of surface undulation at wavelengths of 100 μm to 950 μm of equal to or lower than 0.5 nm.

The grain size of the magnetic recording layer that is formed on the substrate is, for example, less than 10 nm in the perpendicular recording method. When the surface roughness of the substrate surface is great, no improvement in magnetic characteristics can be anticipated even when the bit size is reduced to achieve high-density recording. By contrast, in a substrate in which the arithmetic average Ra of the two types of surface roughness of (1) and (2) are within the above-stated ranges, it is possible to improve magnetic characteristics even when the bit size is reduced to achieve high-density recording. By keeping the arithmetic average Wa of surface undulation of (3) above within the above-stated range, it is possible to improve the flying stability of the magnetic head in a HDD.

Accordingly, in the glass substrate for a magnetic recording medium according to an aspect of the present invention, it is desirable to satisfy any one of (1) to (3), it is preferable to satisfy both (1) and (2), and it is more preferable to satisfy all of (1) to (3).

(Plate Thickness)

In the HDDs employed in laptop computers, a magnetic recording medium 2.5 inches in size is normally employed. The plate thickness of the glass substrate employed therein was 0.635 mm. However, it is desirable to increase the plate thickness to further improve the impact resistance and increase the stiffness of the substrate without changing the specific modulus of elasticity. Accordingly, in the glass substrate for a magnetic recording medium according to an aspect of the present invention, it is desirable for the plate thickness to be equal to or more than 0.5 mm. To further increase the stiffness of the substrate, a plate thickness of equal to or more than 0.7 mm, for example, is preferred, and a plate thickness of equal to or more than 0.8 mm is of even greater preference.

The glass substrate for a magnetic recording medium according to an aspect of the present invention as set forth above can have both high resistance to heat and high fracture toughness. It is thus suitable as a glass substrate for a magnetic recording medium employed in a magnetic recording device required for high reliability in which the rotational speed is equal to or greater than 5,000 rpm, desirably equal to or greater than 7,200 rpm, and preferably, equal to or greater than 10,000 rpm, and as a glass substrate for a magnetic recording medium employed in a magnetic recording device in which a DFH (dynamic flying height) head is mounted.

It is also suitable as a glass substrate for an energy-assisted magnetic recording-use magnetic recording medium based on its high heat resistance and high reliability.

Achieving a substrate having the surface properties of (1) to (3) above is also effective in enhancing the acid resistance and alkali resistance of the glass.

[Glass Substrate Blank for Magnetic Recording Medium]

The glass substrate blank for a magnetic recording medium of the present invention will be described below.

The glass substrate blank for a magnetic recording medium according to an aspect of the present invention comprises essential components in the form of $SiO_2$, $Li_2O$, $Na_2O$, and one or more alkaline earth metal oxides selected from the group consisting of MgO, CaO, SrO, and BaO, wherein a molar ratio of a content of CaO to a combined content of MgO, CaO, SrO, and BaO (CaO/(MgO+CaO+SrO+BaO)) is equal to or less than 0.20, and which has a glass transition temperature of equal to or higher than 650° C.

In this context, the glass substrate blank for a magnetic recording medium (referred to as the substrate blank, hereinafter) means a glass base material for a substrate prior to being finished into a glass substrate for a magnetic recording medium by processing. The composition, characteristics, and desirable ranges of the composition and characteristics of the glass constituting the substrate blank are as set forth above.

The substrate blank according to an aspect of the present invention is desirably disk-shaped because the glass substrate for a magnetic recording medium is disk-shaped.

The substrate blank can be fabricated by obtaining a glass melt by blending and melting glass starting materials calculated to yield the above glass, molding the glass melt thus prepared into a plate by a method such as the press molding method, the down-draw method, or the flow method, and processing the plate-like glass obtained as needed.

In the press molding method, the outflowing glass melt is cut to obtain a desired glass melt gob and the glass melt gob is press molded in a pressing mold to fabricate a substrate blank in the form of a thin disk.

That is, the present invention relates to a method of manufacturing a glass substrate blank for a magnetic recording medium, which comprises blending glass starting materials to provide glass comprising essential components in the form of $SiO_2$, $Li_2O$, $Na_2O$, and one or more alkaline earth metal oxides selected from the group consisting of MgO, CaO, SrO, and BaO, wherein a molar ratio of a content of CaO to a combined content of MgO, CaO, SrO, and BaO (CaO/(MgO+CaO+SrO+BaO)) is equal to or less than 0.20, and which has a glass transition temperature of equal to or higher than 650° C., melting the blended glass starting materials to provide a glass melt, and press molding the glass melt that has been provided to prepare a substrate blank comprised of the glass.

In the press-molding method, the glass melt can be pressed and molded into a disk shape, making this a suitable method for molding a blank for a magnetic recording medium substrate.

Among press-molding methods, the method of dropping a quantity of glass melt corresponding to a single substrate blank and press molding the glass melt in the air is desirable. In that method, the glass melt is sandwiched in the air by a pair of pressing molds and pressed, making it possible to uniformly cool the glass through the surfaces coming into contact with the pressing molds. That permits the manufacturing of a substrate blank with good flatness.

In the down-draw method, a watershoot-shaped molded member is used to guide the glass melt. When the glass melt reaches the two ends of the molded member, it overflows. The two glass melt flows that flow down along the molded member rejoin beneath the molded member, stretching downward to form a sheet. This method is also called the fusion method. By joining together the surfaces of the glass that has contacted the surface of the molded member, it is possible to obtain a glass sheet that is free of contact marks. Subsequently, thin, disk-shaped substrate blanks are cut out of the sheet material obtained.

In the float method, the glass melt is caused to flow out onto a float bath of molten tin or the like, and is molded into a sheet of glass as it spreads. Subsequently, thin, disk-shaped substrate blanks are cut out of the sheet material obtained.

In methods of applying tension to the glass melt to mold it into a sheet, such as the float method and the down-draw method, the glass melt is maintained at relatively low temperature and tension is generated while the glass is in a state of heightened viscosity. Thus, the glass employed is limited to glasses with adequate resistance to devitrification. There is a tradeoff between resistance to devitrification and the glass transition temperature. Thus, methods such as the float method and the down-draw method are unsuitable as molding methods for glasses of high heat resistance. By contrast, since glass that is in a high temperature state can be pressed and rapidly cooled by the press-molding method, even glasses of high heat resistance that do not have great resistance to devitrification can be used to produce substrate blanks with high productivity.

[Method of Manufacturing Glass Substrate for Magnetic Recording Medium]

The first embodiment of the method of manufacturing a glass substrate for a magnetic recording medium according to an aspect of the present invention is a method comprising the step of processing the substrate blank according to an aspect of the present invention set forth above.

The second embodiment of the method of manufacturing a glass substrate for a magnetic recording medium according to an aspect of the present invention is a method comprising the steps of preparing a substrate blank by the method of manufacturing a substrate blank according to an aspect of the present invention set forth above, and processing the substrate blank.

Both of these embodiments desirably comprise a step of immersing the glass in a salt melt containing a sodium salt and a potassium salt to conduct chemical strengthening.

Since the substrate blank is prepared using the above glass, chemical strengthening is conducted so that the tensile stress in the virtual cross section perpendicular to the two main surfaces of the glass substrate peaks at the center between the two main surfaces.

Thus, it is possible to manufacture a glass substrate that has good heat resistance and tends not to develop delayed fracturing. Immersing a glass containing equal to or more than 0.1 mol percent of $Li_2O$ in the above salt melt to chemically strengthen it is desirable for obtaining a glass substrate in which delayed fracturing tends not occur.

When manufacturing a disk-shaped glass substrate, a disk-shaped substrate blank that has been fabricated by the press-molding method, or a disk-shaped substrate blank that has been cut out of a glass sheet fabricated by the down-flow method or float method is employed. A center hole is formed in the substrate blank, the inner and outer circumferences are processed, and the two main surfaces are lapped and polished. Next, a washing step comprising acid washing and alkali washing is conducted to obtain a disk-shaped glass substrate.

Since the glass substrate according to an aspect of the present invention is imparted with good chemical strengthening performance by adjusting the composition set forth above, it is possible to readily form an ion-exchange layer on the surface by chemical strengthening processing.

In the process of manufacturing a glass substrate for a magnetic recording medium, a polishing step can be conducted following the chemical strengthening step to the extent that the effects of chemical strengthening are retained.

[Magnetic Recording Medium]

The magnetic recording medium will be described next.

The magnetic recording medium according to an aspect of the present invention is a magnetic recording medium comprising a magnetic recording layer on the glass substrate for a magnetic recording medium according to an aspect of the present invention set forth above.

For example, the magnetic recording medium can be a disk-shaped magnetic recording medium (called as a magnetic disk, hard disk, or the like) having a structure sequentially comprised of, moving outward from the main surface, at least an adhesive layer, an undercoat layer, a magnetic layer (magnetic recording layer), a protective layer, and a lubricating layer laminated on the main surface of a glass substrate.

For example, the glass substrate is introduced into a film-forming device within which a vacuum has been drawn, and the adhesive layer through the magnetic layer are sequentially formed on the main surface of the glass substrate in an Ar atmosphere by the DC magnetron sputtering method. The adhesive layer may be in the form of, for example, CrTi, and the undercoat layer may be in the form of, for example, CrRu. Following the forming of these films, the protective layer may be formed using C2H4 by the CVD method, for example. Within the same chamber, nitriding can be conducted to incorporate nitrogen into the surface to form a magnetic recording medium. Subsequently, for example, PFPE (polyfluoropolyether) can be coated over the protective layer by the dip coating method to form a lubricating layer.

Further, a soft magnetic layer, seed layer, intermediate layer, or the like can be formed between the undercoat layer and the magnetic layer by a known film-forming method such as sputtering method (including DC magnetron sputtering method, RF magnetron sputtering method, or the like) or vacuum vapor deposition.

Reference can be made, for example, to paragraphs [0027] to [0032] of Japanese Unexamined Patent Publication (KOKAI) No. 2009-110626. A heat sink layer comprised of a material of high thermoconductivity can be formed between the glass substrate and the soft magnetic layer, the details of which are given further below.

As set forth above, to achieve higher density recording on a magnetic recording medium, the magnetic recording layer is desirably formed of a magnetic material of high Ku. To that end, the magnetic recording layer is desirably a magnetic recording layer that contains a magnetic material comprised chiefly of an alloy of Fe and/or Co, and Pt. The magnetic recording medium is desirably a magnetic recording medium for energy-assisted magnetic recording.

Examples of magnetic materials comprised chiefly of an alloy of Fe and/or Co, and Pt are Fe—Pt-based magnetic materials, Co—Pt-based magnetic materials, and Fe—Co—Pt-based magnetic materials. In this context, the word "based" means "containing." That is, the magnetic recording medium according to an aspect of the present invention desirably has a magnetic recording layer containing Fe and Pt, Co and Pt, or Fe, Co, and Pt.

To obtain such a magnetic recording layer, a magnetic material chiefly comprised of an alloy of Fe and/or Co, and Pt is coated on the main surfaces of the glass substrate and annealing is conducted. Here, the temperature at which the film of the magnetic material is formed is normally a high temperature in excess of 500° C. To align the crystalline orientation of these magnetic materials after film formation, the annealing treatment is conducted at a temperature exceeding the film-forming temperature.

Accordingly, when employing a Fe—Pt-based magnetic material, Co—Pt-based magnetic material, or Fe—Co—Pt-based magnetic material to form a magnetic recording layer, the substrate will be exposed to the above elevated temperature. If the glass constituting the substrate has poor heat resistance, it will deform at elevated temperature and lose its flatness. By contrast, the substrate contained in the magnetic recording medium according to an aspect of the present invention exhibits good heat resistance (a glass transition temperature of equal to or higher than 650° C.). Thus, even after forming a magnetic recording layer out of a Fe—Pt-based magnetic material, Co—Pt-based magnetic material, or Fe—Co—Pt-based magnetic material, a high degree of flatness will be maintained.

The above magnetic recording layer can be formed by forming a film out of a Fe—Pt-based magnetic material, Co—Pt-based magnetic material, or Fe—Co—Pt-based magnetic material in an Ar atmosphere by the DC magnetron sputtering method, and then conducting a heat treatment at elevated temperature in a heating furnace.

The Ku (crystal magnetic anisotropy energy constant) is proportional to the coercivity Hc. "Coercivity Hc" denotes the strength of the magnetic field that reverses the magnetization. As set forth above, magnetic materials of high Ku have resistance to thermal fluctuation. Thus, they are known to be materials in which magnetized regions tend not to deteriorate due to thermal fluctuation, even when extremely minute magnetic particles are employed, and are thus suited to high-density recording. However, since Ku and Hc are proportional, as stated above, the higher the Ku, the higher the Hc. That is, the reversal of magnetization by the magnetic head tends not to occur and the writing of information becomes difficult. Accordingly, the recording method of assisting the reversal of magnetization of a magnetic material of high Ku by instantaneously applying energy to the data writing region through the head to lower the coercivity when writing information with a magnetic head has gathered attention in recent years. Such recording methods are referred to as "energy-assisted recording methods." Among them, the recording method of assisting the reversal of magnetization by irradiating a laser beam is referred to as the "heat-assisted recording method," and the recording method that provides assistance by means of microwaves is referred to as the "microwave-assisted recording method". As set forth above, the present invention permits the formation of a magnetic recording layer with a magnetic material of high Ku. Thus, by combining a magnetic material of high Ku with energy-assisted recording, for example, it is possible to achieve high-density recording in which the surface recording density exceeds one terabyte/inch$^2$. That is, the magnetic recording medium according to an aspect of the present invention is preferably employed in an energy-assisted recording method. Heat-assisted recording methods are described in detail, for example, in IEEE Transactions on Magnetics, Vol. 44, No. 1, January 2008 119, and microwave-assisted recording methods are described in detail in, for example, IEEE Transactions on Magnetics, Vol. 44, No. 1, January 2008 125. Energy-assisted recording can also be conducted in the present invention by the methods described in these documents.

The dimensions of the above glass substrate for a magnetic recording medium and magnetic recording medium (such as a magnetic disk) are not specifically limited. For example, the medium and the substrate can be made small because high-density recording is possible. For example, a nominal diameter of 2.5 inches is naturally possible, as are smaller diameters (such as 1 inch and 1.8 inches), or dimensions such as 3 inches and 3.5 inches.

[Magnetic Recording Apparatus]

The magnetic recording device will be described next.

The magnetic recording apparatus according to an aspect of the present invention is a magnetic recording apparatus of energy-assisted magnetic recording system, which comprises a heat-assisted magnetic recording head having a heat source to heat at least a main surface of a magnetic recording medium, a recording element member, and a reproduction element member, and the magnetic recording medium according to an aspect of the present invention.

The present invention can provide a magnetic recording medium of high recording density that is highly reliable by mounting the magnetic recording medium according to an aspect of the present invention.

Since the magnetic recording apparatus is equipped with a substrate of high fracture toughness, adequate reliability is afforded at a high rotational speed of equal to or greater than 5,000 rpm, desirably equal to or greater than 7,200 rpm, and preferably, equal to or greater than 10,000 rpm.

Further, a DFH (Dynamic Flying Height) head is desirably mounted in the magnetic recording apparatus to achieve high recording density.

Examples of the magnetic recording apparatus are the internal memory apparatuses (fixed disks and the like) of various computers such as desktop computers, server-use computers, laptop computers, and mobile computers; the internal memory apparatuses of portable recording and reproduction apparatuses that record and reproduce images and/or sound; and vehicle-mounted audio recording and reproduction apparatus.

EXAMPLES

The present invention is described in greater detail below through Examples. However, the present invention is not limited to the embodiments shown in Examples.

(1) Preparation of Glass Melts

Oxides, carbonates, nitrates, hydroxides, and other starting materials were weighed out and mixed in a manner calculated to yield glasses of the various compositions shown in Tables 2 to 4 to obtain blended starting materials. Each of the starting materials was charged to a melting vessel, heated, melted clarified, and stirred for 3 to 6 hours within a range of 1,500 to 1,600° C. to prepare a homogeneous glass melt free of bubbles and unmelted materials that was then molded. Eight glasses were obtained. No bubbles, unmelted materials, crystal precipitation, or contaminants in the form of refractory materials constituting the melting vessel were found in the glasses Nos. 1 to 16 that were obtained.

(2) Preparation of Substrate Blanks

Next, disk-shaped substrate blanks were prepared by methods A and B below.

(Method A)

The above glass melt that had been clarified and homogenized was caused to flow out of a pipe at a constant flow rate and received in the lower mold of a pressing mold. The outflowing glass melt was cut with a cutting blade to obtain a glass melt gob of prescribed weight on the lower mold. The lower mold carrying the glass melt gob was then immediately removed from beneath the pipe. Using an upper mold facing the lower mold and a sleeve mold, the glass melt was press molded into a thin disk shape measuring 66 mm in diameter and 2 mm in thickness. The press-molded article was cooled to a temperature at which it would not deform, removed from the mold, and annealed, yielding a substrate blank. In the molding, multiple lower molds were used and the outflowing glass melt was continuously molded into disk-shaped substrate blanks.

(Method B)

The glass melt that had been clarified and homogenized was continuously cast from above into the through-holes of a heat-resistant casting mold provided with round through-holes, molded into round rods, and brought out from beneath the through holes. The glass that was brought out was annealed. The glass was then sliced at constant intervals in a direction perpendicular to the axis of the round rods using a multiwire saw to prepare disk-shaped substrate blanks.

Methods A and B were employed in the present Examples. However, methods C and D, described below, are also suitable as methods for manufacturing disk-shaped substrate blanks.

(Method C)

The above glass melt is caused to flow out onto a float bath, molded into sheet glass (molded by the floating method), and then annealed. Disk-shaped pieces of glass can be then cut from the sheet glass to obtain substrate blanks.

(Method D)

The above glass melt is molded into sheet glass by the overflow down draw method (fusion method) and annealed. Disk-shaped pieces of glass can be then cut from the sheet glass to obtain substrate blanks.

(3) Preparation of Glass Substrates

Through-holes were formed in the center of substrate blanks obtained by the various above methods. The inner and outer circumferences thereof were ground and the main surfaces of the disks were lapped and polished (polished to mirror surfaces) to finish them into magnetic disk-use glass substrates 65 mm in diameter and 0.8 mm in thickness. The glass substrates obtained were cleaned with a 1.7 mass percent hydrofluosilicic acid ($H_2SiF$) aqueous solution and a 1 mass percent potassium hydroxide aqueous solution. They were then rinsed with pure water and dried. The surfaces of the substrates prepared from the ten glasses shown in Table 2 were observed under magnification, revealing no surface roughness. The surfaces were smooth.

Next, the disk-shaped glass substrates were immersed in a mixed salt melt of sodium nitrate and potassium nitrate and glass substrates having an ion-exchange layer on the surfaces thereof were obtained by ion exchange (chemical strengthening). The chemical strengthening conditions are given in Tables 2 to 4. Conducting the ion-exchange processing (chemical strengthening processing) in this manner effectively enhance the impact resistance of the glass substrates. The cross sections (cut surfaces of the ion-exchange layers) of glass substrates sampled from a number of glass substrates that had been subjected to the ion-exchange treatment were observed by the Babinet method and the fact that ion-exchange layers had formed was confirmed.

The ion-exchange layer can be formed over the entire region of the glass substrate surface, formed on just the outer circumference surface, or formed on just the outer circumference surface and the inner circumference surface.

After ion-exchange processing, it is possible to conduct mirror-surface polishing in a manner that does not remove the ion-exchange layer. To not greatly reduce the fracture toughness value $K_{1c}$, it is desirable to leave behind an adequate ion-exchange layer. From this perspective, it is desirable to remove equal to or less than 5 μm in mirror-surface polishing.

(4) Formation of Magnetic Disks

The following method was used to sequentially form an adhesive layer, undercoat layer, magnetic layer, protective layer, and lubricating layer on the main surface of each of the glass substrates described above, yielding magnetic disks.

First, a film-forming apparatus in which a vacuum had been drawn was employed to sequentially form the adhesive layer, undercoat layer, and magnetic layer in an Ar atmosphere by the DC magnetron sputtering method.

At the time, the adhesive layer was formed as an amorphous CrTi layer 20 nm in thickness using a CrTi target. Next, a single-substrate, static opposed type film-forming apparatus was employed to form a layer 10 nm in thickness comprised of CrRu as an undercoat layer by the DC magnetron sputtering method in an Ar atmosphere. Further, the magnetic layer was formed at a film forming temperature of 400° C. using an FePt or CoPt target to obtain an FePt or CoPt layer 10 nm in thickness.

The magnetic disks on which magnetic layers had been formed were moved from the film-forming apparatus into a heating furnace and annealed under the condition suitably selected within a temperature range of 650 to 700° C.

Next, a 3 nm protective layer comprised of hydrogenated carbon was formed by CVD method using ethylene as the material gas. Subsequently, PFPE (perfluoropolyether) was used to form a lubricating layer by the dip coating method. The lubricating layer was 1 nm in thickness.

The above manufacturing process yielded magnetic disks.

1. Glass Evaluation (1) Glass Transition Temperature Tg, Thermal Expansion Coefficient The glass transition temperature Tg of the sample prior to being subjected to chemical strengthening processing, and the average coefficient of linear expansion α at 100 to 300° C. and 500 to 600° C. were measured with a thermo mechanical analyzer (Thermo plus TMA 8310) made by Rigaku Corp. These characteristics exhibit almost no change before and after chemical strengthening processing. Thus, the glass substrates following chemical strengthening processing were deemed to have the glass transition temperatures Tg and average coefficients of linear expansion α at 100 to 300° C. and 500 to 600° C. that were obtained above by measurement.

(2) Young's Modulus

The Young's modulus of the sample was measured prior to chemical strengthening processing by the ultrasonic method. Since the Young's modulus exhibits almost no change before and after chemical strengthening processing, the glass substrate following chemical strengthening processing was deemed to have the Young's modulus obtained by measurement above.

(3) Specific Gravity

The specific gravity of the sample was measured prior to chemical strengthening processing by Archimedes' method. Since the specific gravity exhibits almost no change before and after chemical strengthening processing, the glass substrate following chemical strengthening processing was deemed to have the specific gravity obtained by measurement above.

(4) Specific Modulus of Elasticity

The specific modulus of elasticity was calculated from the Young's modulus obtained in (2) above and the specific gravity obtained (3).

(5) Fracture Toughness Value

Employing an MVK-E device made by Akashi, a Vickers indenter was pressed with an indentation load of 9.81 N into samples that had been processed into plates and chemically strengthened under the conditions given in Tables 2 to 4, introducing an indentation and a crack into each sample.

The Young's modulus E [GPa], indentation diagonal length, and half length of the surface crack were measured, and the fracture toughness value $K_{1c}$ was calculated from the load and Young's modulus of the sample.

(6) Tav/Tmax

The cross sections in the direction of plate thickness of samples that had been processed into plates and chemically strengthened under the conditions described in Tables 2 to 4 were observed by the Babinet method, the Tmax and Tav were calculated by the above-described method, and Tav/Tmax was calculated from the values obtained.

2. Evaluation of the Substrate (Surface Roughness, Surface Undulation)

A 5 μm×5 μm square region of the main surface (the surface on which the magnetic recording layer and the like were laminated) of each of the substrates before and after chemical strengthening processing was observed by an atomic force microscope (AFM) at a resolution of 512×256 pixels, and the arithmetic average Ra of the surface roughness measured at a resolution of 512×256 pixels over an area of 1 μm×1 μm and the arithmetic average Ra of the surface roughness measured at a resolution of 512×256 pixels over an area of 5 μm×5 μm were measured. Further, the main surfaces of each substrate were observed with an optical surface profilometer and the arithmetic average of the surface undulation Wa was measured at wavelengths of 100 μm to 950 μm.

In the measurement results, the arithmetic average Ra of the surface roughness measured over an area of 1 μm×1 μm ranged from 0.05 to 0.15 nm, and the arithmetic average Ra of the surface roughness over an area of 5 μm×5 μm ranged from 0.03 to 0.12 nm. The arithmetic average of the surface undulation Wa as measured at wavelengths of 100 μm to 950 μm was 0.2 to 0.5 nm. These were ranges that presented no problems in substrates employed in high recording density magnetic recording media.

Figure 5:
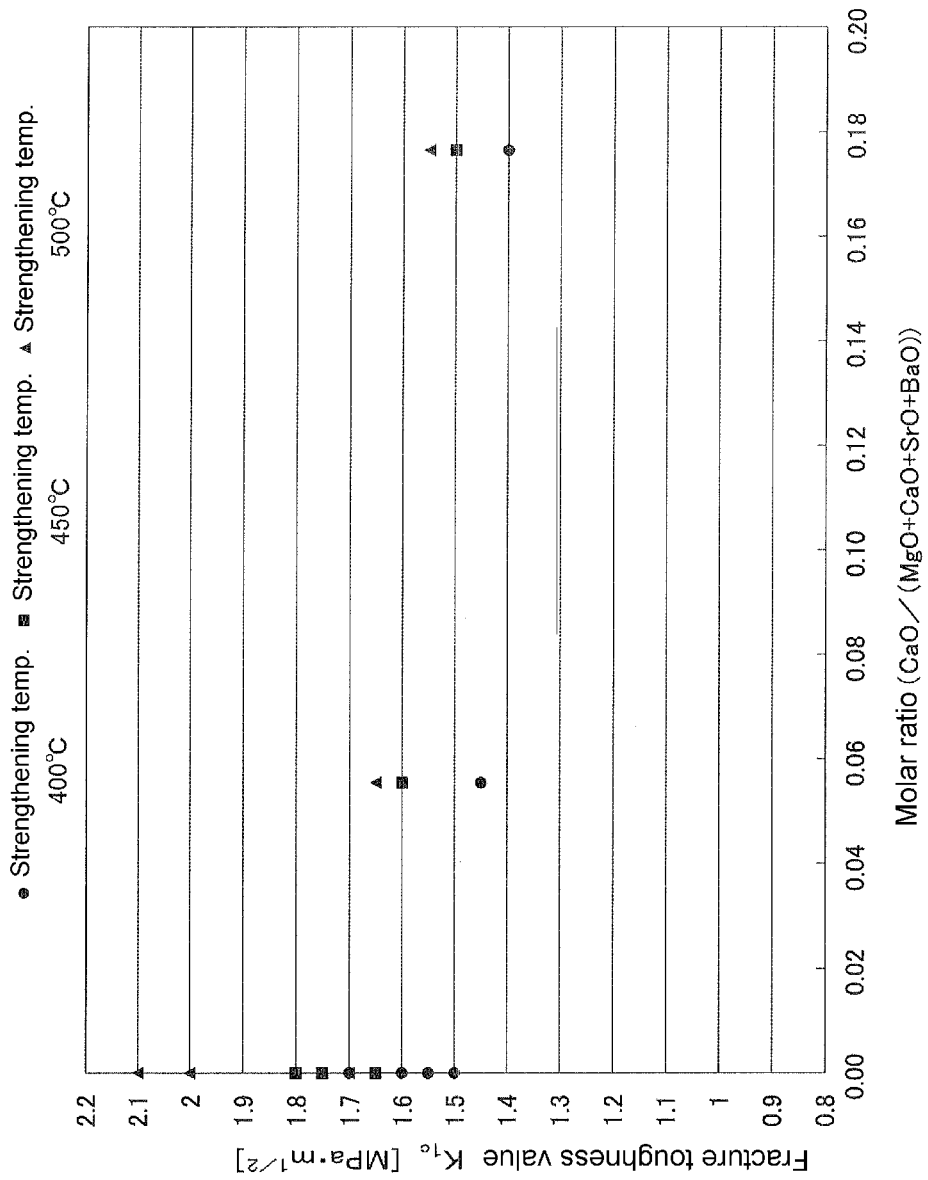
FIG. 5 is a graph showing the effects of the molar ratio CaO/(MgO+CaO+SrO+BaO)) on the fracture toughness value following chemical strengthening.

As shown in Tables 2 to 4, the substrates comprised of chemically strengthened glasses Nos. 1 to 16 possessed all four of the characteristics required of magnetic recording media substrates, namely: high heat resistance (a high glass transition temperature), high stiffness (a high Young's modulus), a high thermal expansion coefficient, and high fracture toughness. Based on the results shown in Tables 2 to 4, the substrates comprised of glasses Nos. 1 to 16 were found to have high specific moduli of elasticity capable of withstanding high-speed rotation and low specific gravities, permitting substrate weight reduction. Additionally, the glasses used in Examples to fabricate glass substrates readily permitted the formation of ion-exchange layers by chemical strengthening processing. As a result, they were found to exhibit high fracture toughness. FIG. 5 is a graph in which the fracture toughness value following chemical strengthening is plotted against the molar ratio (CaO/(MgO+CaO+SrO+BaO)) for glasses Nos. 1 to 7, 11, and 12 in Tables 2 and 4. From this graph, it was determined that as the molar ratio (CaO/(MgO+CaO+SrO+BaO)) decreased, the fracture toughness value—that is, the mechanical strength—increased.

Additionally, when glass (No. 17) shown in Table 5, which had a large molar ratio (CaO/(MgO+CaO+SrO+BaO)) of about 0.29, was chemically strengthened with a salt melt at a temperature of 500° C., a fracture toughness of 0.74 MPa·m$^{1/2}$ was achieved. Further, when multiple sheets of glass were simultaneously immersed in a salt melt at 500° C. and chemically strengthened, the salt melt deteriorated sharply and the fracture toughness value following strengthening did not reach 0.74 MPa·m$^{1/2}$. Similarly, when several sheets of glass were sequentially immersed in a 500° C. salt melt and chemically strengthened, the fracture toughness value of the glass after the second and subsequent chemical strengthening decreased abruptly. This was presumed to have occurred because, as set forth above, the $Ca^{2+}$ ions contained in the glass composition leached into the salt melt, blocking the ion effect of the alkali metal ions. Similar results were observed when the molar ratio (CaO/(MgO+CaO+SrO+BaO)) was greater than 0.2

By contrast, when multiple sheets of the various glasses of Nos. 1 to 16 in Tables 2 to 4 were simultaneously immersed in a salt melt and chemically strengthened, it was possible to maintain a fracture toughness value of equal to or greater than 0.80 MPa·m$^{1/2}$. Further, when multiple sheets of the various glasses of Nos. 1 to 16 were sequentially immersed in a salt melt and chemically strengthened, it was possible to maintain a fracture toughness value of equal to or greater than 0.80 MPa·m$^{1/2}$.

In such glasses with a molar ratio (CaO/(MgO+CaO+SrO+BaO)) of equal to or lower than 0.20, deterioration of the salt melt due to chemical strengthening tended not to occur and it was possible to stably produce chemically strengthened glasses with high fracture toughness values. By contrast, when the molar ratio (CaO/(MgO+CaO+SrO+BaO))

exceeded 0.20, the salt melt was deteriorated by chemical strengthening and it became difficult to maintain a high fracture toughness value.

In glasses Nos. 1 to 7 following chemical strengthening, compressive stress layers 30 to 120 μm in depth were formed in the surface. The magnitude of the compressive stress was a value of equal to or higher than 2.0 kgf/mm² (a value of equal to or higher than 19.6 MPa). In glasses Nos. 8 to 16, compressive stress layers 20 to 120 μm in depth were formed in the surface. The magnitude of the compressive stress was a value of equal to or higher than 2.0 kgf/mm² (a value of equal to or higher than 19.6 MPa).

Based on these results, the present invention was confirmed to provide a glass having all of the characteristics required by a magnetic recording medium substrate.

Further, with the exception that mirror-surface polishing was conducted to within a range of 0.5 to 5 μM following ion-exchange processing, glass substrates were fabricated by the same method as above. Observation by the Babinet method of the cross sections of the multiple glass substrates obtained revealed the formation of ion-exchange layers and no deterioration of mechanical strength. Other characteristics were identical to those set forth above.

For the various Examples (the various glasses of Nos. 1 to 16 following chemical strengthening), in cross-sectional photographs obtained by observation by the Babinet method, the tensile stress distribution was convex in shape and there was no uphill in the stress profile in a virtual cross section perpendicular to the two main surfaces. When Tav/Tmax was calculated by the method set forth above that has been explained on the basis of FIG. 3 and based on these stress profiles, the Tav/Tmax value following chemical strengthening of glasses Nos. 1 to 13 was equal to or higher than 0.8. The Tav/Tmax values following chemical strengthening of glasses Nos. 14 to 16 was equal to or higher than 0.5.

The following tests were conducted to demonstrate that the above chemically strengthened glass substrates exhibiting the above stress profiles did not indicate delayed fractures.

Indentations made by pressing a Vickers indenter at an indentation load of 9.81N were present in the samples following chemical strengthening processing for which the fracture toughness value had been measured in Examples. The samples with indentations were placed in an environment tester and left standing for 7 days in an environment of a temperature of 80° C. and a relative humidity of 80%. They were then removed and the indentations were observed. For each of Examples, 100 samples were prepared and the test was conducted. As a result, no crack extension was observed from the indentations in any of the samples.

By contrast, when glasses containing $Na_2O$ and $K_2O$ but not containing $Li_2O$—for example, glass composition No. 1, a glass composition in which the total quantity of $Li_2O$ was replaced with $Na_2O$—were immersed in a potassium nitrate salt melt and chemically strengthened samples were prepared, uphills such as those shown in FIG. 2 were observed in the stress profile by the Babinet method and Tav/Tmax<0.5. When these samples were subjected to the above test, eight of the 100 sheets exhibited lengthening of cracks from the indentations. Three of the sheets exhibited marked crack extension and had fractures.

Based on the above acceleration testing for delayed fracturing, a delayed fracturing prevention effect was found to have been achieved in the chemically strengthened glass substrates of Examples.

TABLE 2

| | No. 1 | | No. 2 | |
| --- | --- | --- | --- | --- |
| | mol % | mass % | mol % | mass % |
| $SiO_2$ | 65 | 64.7 | 65 | 63.55 |
| $Al_2O_3$ | 6 | 10.13 | 6 | 9.96 |
| $Li_2O$ | 1 | 0.5 | 1 | 0.49 |
| $Na_2O$ | 9 | 9.24 | 8 | 8.07 |
| $K_2O$ | 0 | 0 | 0 | 0 |
| MgO | 17 | 11.35 | 14 | 9.18 |
| CaO | 0 | 0 | 3 | 2.74 |
| SrO | 0 | 0 | 0 | 0 |
| BaO | 0 | 0 | 0 | 0 |
| $ZrO_2$ | 2 | 4.08 | 3 | 6.02 |
| Total | 100 | 100 | 100 | 100 |
| CaO/RO | 0.000 | 0.000 | 0.176 | 0.230 |
| $CaO/Na_2O$ | 0.000 | 0.000 | 0.375 | 0.340 |
| MgO + CaO + SrO + BaO(=RO) | 17 | 11.35 | 17 | 11.92 |
| MgO + CaO + BaO | 17 | 11.35 | 17 | 11.92 |
| CaO/(MgO + CaO + BaO) | 0 | 0 | 0.176 | 0.230 |
| $K_2O/Na_2O$ | 0 | 0 | 0 | 0 |
| $ZrO_2 + TiO_2 + Y_2O_3 + La_2O_3 + Gd_2O_3 + Yb_2O_3 + Nb_2O_5 + Ta_2O_5 + HfO_2$ | 2 | 4.08 | 3 | 6.02 |
| $SiO_2 + ZrO_2 + TiO_2 + Y_2O_3 + La_2O_3 + Gd_2O_3 + Yb_2O_3 + Nb_2O_5 + Ta_2O_5 + HfO_2$ | 67 | 68.78 | 68 | 69.57 |
| $SiO_2 + ZrO_2$ | 67 | 68.78 | 68 | 69.57 |
| $Al_2O_3/SiO_2$ | 0.092 | 0.157 | 0.092 | 0.157 |
| Specific gravity | 2.54 | | 2.58 | |
| Glass transition temp.[° C.] | 671 | | 672 | |
| Average linear expansion coefficient 100 to 300° C. [×10⁻⁷/° C.] | 66 | | 66 | |
| Average coefficient of linear expansion 500 to 600° C. [×10⁻⁷/° C.] | 77 | | 77 | |
| Young's modulus [GPa] | 84.0 | | 85.9 | |
| Specific modulus of elasticity [MN/kg] | 33 | | 33 | |
| Fracture toughness value — Strengthening temp. = 400° C. Strengthening period = 4 hours Potassium nitrate:sodium | 1.55 | | 1.4 | |

TABLE 2-continued

| | | | |
|---|---|---|---|
| [MPa · m$^{1/2}$] | nitrate = 60%:40%<br>Strengthening temp. = 450° C.<br>Strengthening period = 4 hours<br>Potassium nitrate:sodium nitrate = 60%:40% | 1.75 | 1.5 |
| | Strengthening temp. = 500° C.<br>Strengthening period = 4 hours<br>Potassium nitrate:sodium nitrate = 60%:40% | 1.8 | 1.55 |
| | Strengthening temp. = 550° C.<br>Strengthening period = 4 hours<br>Potassium nitrate:sodium nitrate = 60%:40% | 2.1 | 1.8 |
| | Strengthening temp. = 600° C.<br>Strengthening period = 4 hours<br>Potassium nitrate:sodium nitrate = 60%:40% | | |
| Tav/Tmax<br>Strengthening temp. = 400° C.<br>Strengthening period = 4 hours<br>Potassium nitrate:sodium nitrate = 60%:40% | | 0.83 | 0.84 |

| | | No. 3 | | No. 4 | |
|---|---|---|---|---|---|
| | | mol % | mass % | mol % | mass % |
| SiO$_2$ | | 67 | 67 | 65.5 | 64.42 |
| Al$_2$O$_3$ | | 4 | 6.79 | 5 | 8.34 |
| Li$_2$O | | 1 | 0.5 | 1 | 0.49 |
| Na$_2$O | | 7 | 7.22 | 9 | 9.13 |
| K$_2$O | | 0 | 0 | 0 | 0 |
| MgO | | 17 | 11.4 | 16 | 10.56 |
| CaO | | 1 | 0.93 | 0 | 0 |
| SrO | | 0 | 0 | 0 | 0 |
| BaO | | 0 | 0 | 0 | 0 |
| ZrO$_2$ | | 3 | 6.15 | 3.5 | 7.06 |
| Total | | 100 | 100 | 100 | 100 |
| CaO/RO | | 0.056 | 0.075 | 0.000 | 0.000 |
| CaO/Na$_2$O | | 0.143 | 0.129 | 0.000 | 0.000 |
| MgO + CaO + SrO + BaO(=RO) | | 18 | 12.33 | 16 | 10.56 |
| MgO + CaO + BaO | | 18 | 12.33 | 16 | 10.56 |
| CaO/(MgO + CaO + BaO) | | 0.056 | 0.075 | 0 | 0 |
| K$_2$O/Na$_2$O | | 0 | 0 | 0 | 0 |
| ZrO$_2$ + TiO$_2$ + Y$_2$O$_3$ + La$_2$O$_3$ + Gd$_2$O$_3$ + Yb$_2$O$_3$ + Nb$_2$O$_5$ + Ta$_2$O$_5$ + HfO$_2$ | | 3 | 6.15 | 3.5 | 7.06 |
| SiO$_2$ + ZrO$_2$ + TiO$_2$ + Y$_2$O$_3$ + La$_2$O$_3$ + Gd$_2$O$_3$ + Yb$_2$O$_3$ + Nb$_2$O$_5$ + Ta$_2$O$_5$ + HfO$_2$ | | 70 | 73.15 | 69 | 71.48 |
| SiO$_2$ + ZrO$_2$ | | 70 | 73.15 | 69 | 71.48 |
| Al$_2$O$_3$/SiO$_2$ | | 0.060 | 0.101 | 0.076 | 0.129 |
| Specific gravity | | 2.57 | | 2.58 | |
| Glass transition temp. [° C.] | | 680 | | 680 | |
| Average linear expansion coefficient 100 to 300° C. [×10$^{-7}$/° C.] | | 61 | | 66 | |
| Average coefficient of linear expansion 500 to 600° C. [×10$^{-7}$/° C.] | | 71 | | 77 | |
| Young's modulus [GPa] | | 86.2 | | 85.3 | |
| Specific modulus of elasticity [MN/kg] | | 33.5 | | 33 | |
| Fracture toughness value [MPa · m$^{1/2}$] | Strengthening temp. = 400° C.<br>Strengthening period = 4 hours<br>Potassium nitrate:sodium nitrate = 60%:40% | 1.45 | | 1.5 | |
| | Strengthening temp. = 450° C.<br>Strengthening period = 4 hours<br>Potassium nitrate:sodium nitrate = 60%:40% | 1.6 | | 1.65 | |
| | Strengthening temp. = 500° C.<br>Strengthening period = 4 hours<br>Potassium nitrate:sodium nitrate = 60%:40% | 1.65 | | 1.7 | |
| | Strengthening temp. = 550° C.<br>Strengthening period = 4 hours<br>Potassium nitrate:sodium nitrate = 60%:40% | 1.7 | | 1.75 | |
| | Strengthening temp. = 600° C.<br>Strengthening period = 4 hours<br>Potassium nitrate:sodium nitrate = 60%:40% | | | | |

TABLE 2-continued

| | | | |
|---|---|---|---|
| Tav/Tmax Strengthening temp. = 400° C. Strengthening period = 4 hours Potassium nitrate:sodium nitrate = 60%:40% | | 0.84 | 0.83 |

| | No. 5 | | No. 6 | | No. 7 | |
|---|---|---|---|---|---|---|
| | mol % | mass % | mol % | mass % | mol % | mass % |
| $SiO_2$ | 61 | 59.8 | 61 | 58.97 | 63 | 62.1 |
| $Al_2O_3$ | 11 | 18.3 | 11 | 18.05 | 10 | 16.73 |
| $Li_2O$ | 1 | 0.49 | 1 | 0.48 | 1 | 0.49 |
| $Na_2O$ | 6.5 | 6.57 | 10.5 | 10.47 | 6 | 6.1 |
| $K_2O$ | 0 | 0 | 0 | 0 | 0 | 0 |
| MgO | 19.5 | 12.82 | 15.5 | 10.05 | 19 | 12.56 |
| CaO | 0 | 0 | 0 | 0 | 0 | 0 |
| SrO | 0 | 0 | 0 | 0 | 0 | 0 |
| BaO | 0 | 0 | 0 | 0 | 0 | 0 |
| $ZrO_2$ | 1 | 2.01 | 1 | 1.98 | 1 | 2.02 |
| Total | 100 | 100 | 100 | 100 | 100 | 100 |
| CaO/RO | 0.000 | 0.000 | 0.000 | 0.000 | 0.000 | 0.000 |
| $CaO/Na_2O$ | 0.000 | 0.000 | 0.000 | 0.000 | 0.000 | 0.000 |
| MgO + CaO + SrO + BaO(=RO) | 19.5 | 12.82 | 15.5 | 10.05 | 19 | 12.56 |
| MgO + CaO + BaO | 19.5 | 12.82 | 15.5 | 10.05 | 19 | 12.56 |
| CaO/(MgO + CaO + BaO) | 0 | 0 | 0 | 0 | 0 | 0 |
| $K_2O/Na_2O$ | 0 | 0 | 0 | 0 | 0 | 0 |
| $ZrO_2 + TiO_2 + Y_2O_3 + La_2O_3 + Gd_2O_3 + Yb_2O_3 + Nb_2O_5 + Ta_2O_5 + HfO_2$ | 1 | 2.01 | 1 | 1.98 | 1 | 2.02 |
| $SiO_2 + ZrO_2 + TiO_2 + Y_2O_3 + La_2O_3 + Gd_2O_3 + Yb_2O_3 + Nb_2O_5 + Ta_2O_5 + HfO_2$ | 62 | 61.81 | 62 | 60.96 | 64 | 64.12 |
| $SiO_2 + ZrO_2$ | 62 | 61.81 | 62 | 60.95 | 64 | 64.12 |
| $Al_2O_3/SiO_2$ | 0.180 | 0.306 | 0.180 | 0.306 | 0.159 | 0.269 |
| Specific gravity | 2.56 | | 2.53 | | 2.54 | |
| Glass transition temp.[° C.] | 706 | | 678 | | 703 | |
| Average linear expansion coefficient 100 to 300° C. [×$10^{-7}$/° C.] | 58 | | 70 | | 56 | |
| Average coefficient of linear expansion 500 to 600° C. [×$10^{-7}$/° C.] | 68 | | 82 | | 65 | |
| Young's modulus [GPa] | 89.2 | | 83.4 | | 88.4 | |
| Specific modulus of elasticity [MN/kg] | 36 | | 33.9 | | 35.7 | |
| Fracture toughness value [MPa·$m^{1/2}$] Strengthening temp. = 400° C. Strengthening period = 4 hours Potassium nitrate:sodium nitrate = 60%:40% | 1.7 | | 1.6 | | 1.55 | |
| Strengthening temp. = 450° C. Strengthening period = 4 hours Potassium nitrate:sodium nitrate = 60%:40% | 1.8 | | 1.8 | | 1.75 | |
| Strengthening temp. = 500° C. Strengthening period = 4 hours Potassium nitrate:sodium nitrate = 60%:40% | 2 | | 2.1 | | 2 | |
| Strengthening temp. = 550° C. Strengthening period = 4 hours Potassium nitrate:sodium nitrate = 60%:40% | 1.95 | | 2.55 | | 2.55 | |
| Strengthening temp. = 600° C. Strengthening period = 4 hours Potassium nitrate:sodium nitrate = 60%:40% | 1.95 | | 2.6 | | 2.5 | |
| Tav/Tmax Strengthening temp. = 400° C. Strengthening period = 4 hours Potassium nitrate:sodium nitrate = 60%:40% | 0.85 | | 0.81 | | 0.8 | |

TABLE 3

|  | No. 8 | | No. 9 | |
|---|---|---|---|---|
|  | mol % | mass % | mol % | mass % |
| $SiO_2$ | 62.76 | 62.57 | 66 | 65.55 |
| $Al_2O_3$ | 10.5 | 17.76 | 5 | 8.43 |
| $Li_2O$ | 2 | 0.99 | 1 | 0.49 |
| $Na_2O$ | 5 | 5.14 | 7 | 7.17 |
| $K_2O$ | 0 | 0 | 0 | 0 |
| $MgO$ | 19.5 | 13.04 | 17 | 11.33 |
| $CaO$ | 0 | 0 | 1 | 0.93 |
| $SrO$ | 0 | 0 | 0 | 0 |
| $BaO$ | 0 | 0 | 0 | 0 |
| $ZrO_2$ | 0.24 | 0.49 | 3 | 6.11 |
| Total | 100 | 100 | 100 | 100 |
| CaO/RO | 0.000 | 0.000 | 0.056 | 0.076 |
| $CaO/Na_2O$ | 0.000 | 0.000 | 0.143 | 0.130 |
| $MgO + CaO + SrO + BaO$ (=RO) | 19.5 | 13.04 | 18 | 12.26 |
| $MgO + CaO + BaO$ | 19.5 | 13.04 | 18 | 12.26 |
| $CaO/(MgO + CaO + BaO)$ | 0 | 0 | 0.056 | 0.076 |
| $K_2O/Na_2O$ | 0 | 0 | 0 | 0 |
| $ZrO_2 + TiO_2 + Y_2O_3 + La_2O_3 + Gd_2O_3 + Yb_2O_3 + Nb_2O_5 + Ta_2O_5 + HfO_2$ | 0.24 | 0.49 | 3 | 6.11 |
| $SiO_2 + ZrO_2 + TiO_2 + Y_2O_3 + La_2O_3 + Gd_2O_3 + Yb_2O_3 + Nb_2O_5 + Ta_2O_5 + HfO_2$ | 63 | 63.06 | 69 | 71.66 |
| $SiO_2 + ZrO_2$ | 63 | 63.06 | 69 | 71.66 |
| $Al_2O_3/SiO_2$ | 0.167 | 0.284 | 0.076 | 0.129 |
| Fracture toughness value [$MPa \cdot m^{1/2}$] | 1.33 | | 1.68 | |
| Chemical strengthening temp. [° C.] | 450 | | 500 | |
| Chemical strengthening period [hours] | 4 | | 6 | |
| Potassium nitrate:sodium nitrate | 60%:40% | | 90%:10% | |
| Tav/Tmax | 0.89 | | 0.85 | |
| Specific gravity | 2.55 | | 2.58 | |
| Glass transition temp. [° C.] | 692.9 | | 681 | |
| Average coefficient of linear expansion 100 to 300° C. [$\times 10^{-7}$/° C.] | 54 | | 63 | |
| Average coefficient of linear expansion 500 to 600° C. [$\times 10^{-7}$/° C.] | 63 | | 73 | |
| Young's modulus [GPa] | 85.2 | | 86.5 | |
| Specific modulus of elasticity [MN/kg] | 33.4 | | 33.5 | |

TABLE 3-continued

|  | No. 10 | |
|---|---|---|
|  | mol % | mass % |
| $SiO_2$ | 65.5 | 64.48 |
| $Al_2O_3$ | 5 | 8.35 |
| $Li_2O$ | 1 | 0.49 |
| $Na_2O$ | 8 | 8.12 |
| $K_2O$ | 0 | 0 |
| $MgO$ | 16 | 10.57 |
| $CaO$ | 1 | 0.92 |
| $SrO$ | 0 | 0 |
| $BaO$ | 0 | 0 |
| $ZrO_2$ | 3.5 | 7.07 |
| Total | 100 | 100 |
| CaO/RO | 0.059 | 0.080 |
| $CaO/Na_2O$ | 0.125 | 0.113 |
| $MgO + CaO + SrO + BaO$ (=RO) | 17 | 11.49 |
| $MgO + CaO + BaO$ | 17 | 11.49 |
| $CaO/(MgO + CaO + BaO)$ | 0.059 | 0.080 |
| $K_2O/Na_2O$ | 0 | 0 |
| $ZrO_2 + TiO_2 + Y_2O_3 + La_2O_3 + Gd_2O_3 + Yb_2O_3 + Nb_2O_5 + Ta_2O_5 + HfO_2$ | 3.5 | 7.07 |
| $SiO_2 + ZrO_2 + TiO_2 + Y_2O_3 + La_2O_3 + Gd_2O_3 + Yb_2O_3 + Nb_2O_5 + Ta_2O_5 + HfO_2$ | 69 | 71.55 |
| $SiO_2 + ZrO_2$ | 69 | 71.55 |
| $Al_2O_3/SiO_2$ | 0.076 | 0.129 |
| Fracture toughness value [$MPa \cdot m^{1/2}$] | 1.39 | |
| Chemical strengthening temp. [° C.] | 450 | |
| Chemical strengthening period [hours] | 2 | |
| Potassium nitrate:sodium nitrate | 80%:20% | |
| Tav/Tmax | 0.84 | |
| Specific gravity | 2.59 | |
| Glass transition temp. [° C.] | 681 | |
| Average coefficient of linear expansion 100 to 300° C. [$\times 10^{-7}$/° C.] | 65 | |
| Average coefficient of linear expansion 500 to 600° C. [$\times 10^{-7}$/° C.] | 76 | |
| Young's modulus [GPa] | 86.3 | |
| Specific modulus of elasticity [MN/kg] | 33.3 | |

TABLE 4

|  | No. 11 | | No. 12 | |
|---|---|---|---|---|
|  | mol % | mass % | mol % | mass % |
| $SiO_2$ | 65 | 64.62 | 63 | 61.78 |
| $Al_2O_3$ | 6 | 10.12 | 10 | 16.64 |
| $Li_2O$ | 1 | 0.49 | 1 | 0.49 |
| $Na_2O$ | 9 | 9.23 | 6 | 6.07 |
| $K_2O$ | 0 | 0 | 0 | 0 |
| $MgO$ | 16.5 | 11 | 17 | 11.18 |
| $CaO$ | 0.5 | 0.46 | 2 | 1.83 |
| $SrO$ | 0 | 0 | 0 | 0 |
| $BaO$ | 0 | 0 | 0 | 0 |
| $ZrO_2$ | 2 | 4.08 | 1 | 2.01 |
| Total | 100.00 | 100.00 | 100.00 | 100.00 |
| CaO/RO | 0.029 | 0.040 | 0.105 | 0.141 |
| $CaO/Na_2O$ | 0.056 | 0.050 | 0.333 | 0.301 |
| $MgO + CaO + SrO + BaO$ (=RO) | 17 | 11.46 | 19 | 13.01 |
| $MgO + CaO + BaO$ | 17 | 11.46 | 19 | 13.01 |
| $CaO/(MgO + CaO + BaO)$ | 0.029 | 0.040 | 0.105 | 0.141 |
| $K_2O/Na_2O$ | 0 | 0 | 0 | 0 |
| $ZrO_2 + TiO_2 + Y_2O_3 + La_2O_3 + Gd_2O_3 + Yb_2O_3 + Nb_2O_5 + Ta_2O_5 + HfO_2$ | 2 | 4.08 | 1 | 2.01 |
| $SiO_2 + ZrO_2 + TiO_2 + Y_2O_3 + La_2O_3 + Gd_2O_3 + Yb_2O_3 + Nb_2O_5 + Ta_2O_5 + HfO_2$ | 67 | 68.7 | 64 | 63.79 |

TABLE 4-continued

| | | | | | |
|---|---|---|---|---|---|
| SiO₂ + ZrO₂ | | 67 | 68.7 | 64 | 63.79 |
| Al₂O₃/SiO₂ | | 0.092 | 0.157 | 0.159 | 0.269 |
| Specific gravity | | 2.55 | | 2.56 | |
| Glass transition temp [° C.] | | 669 | | 700 | |
| Average linear expansion coefficient 100 to 300° C. [×10⁻⁷/° C.] | | 67 | | 56 | |
| Average linear expansion coefficient 500 to 600° C. [×10⁻⁷/° C.] | | 78 | | 65 | |
| Young's modulus [GPa] | | 83.9 | | 86.4 | |
| Specific modulus of elasticity [MN/kg] | | 32.9 | | 33.8 | |
| Fracture toughness value [MPa · m^(1/2)] | Strengthening temp. = 400° C. Strengthening period = 4 hours Potassium nitrate:sodium nitrate = 60%:40% | 1.5 | | 1.45 | |
| | Strengthening temp. = 450° C. Strengthening period = 4 hours Potassium nitrate:sodium nitrate = 60%:40% | 1.65 | | 1.55 | |
| | Strengthening temp. = 500° C. Strengthening period = 4 hours Potassium nitrate:sodium nitrate = 60%:40% | 1.7 | | 1.6 | |
| Tav/Tmax Strengthening temp. = 400° C. Strengthening period = 4 hours Potassium nitrate:sodium nitrate = 60%:40% | | 0.8 | | 0.81 | |

| | No. 13 | | No. 14 | |
|---|---|---|---|---|
| | mol % | mass % | mol % | mass % |
| SiO₂ | 65.12 | 64.69 | 64.94 | 64.56 |
| Al₂O₃ | 6.01 | 10.13 | 5.99 | 10.12 |
| Li₂O | 0.6 | 0.3 | 0.6 | 0.3 |
| Na₂O | 9.24 | 9.46 | 8.39 | 8.61 |
| K₂O | 0 | 0 | 0 | 0 |
| MgO | 17.03 | 11.34 | 16.98 | 11.32 |
| CaO | 0 | 0 | 1.1 | 1.02 |
| SrO | 0 | 0 | 0 | 0 |
| BaO | 0 | 0 | 0 | 0 |
| ZrO₂ | 2 | 4.08 | 2 | 4.07 |
| Total | 100.00 | 100.00 | 100.00 | 100.00 |
| CaO/RO | 0.000 | 0.000 | 0.061 | 0.083 |
| CaO/Na₂O | 0.000 | 0.000 | 0.131 | 0.118 |
| MgO + CaO + SrO + BaO(=RO) | 17.03 | 11.34 | 18.08 | 12.34 |
| MgO + CaO + BaO | 17.03 | 11.34 | 18.08 | 12.34 |
| CaO/(MgO + CaO + BaO) | 0 | 0 | 0.061 | 0.083 |
| K₂O/Na₂O | 0 | 0 | 0 | 0 |
| ZrO₂ + TiO₂ + Y₂O₃ + La₂O₃ + Gd₂O₃ + Yb₂O₃ + Nb₂O₅ + Ta₂O₅ + HfO₂ | 2 | 4.08 | 2 | 4.07 |
| SiO₂ + ZrO₂ + TiO₂ + Y₂O₃ + La₂O₃ + Gd₂O₃ + Yb₂O₃ + Nb₂O₅ + Ta₂O₅ + HfO₂ | 67.12 | 68.77 | 66.94 | 68.63 |
| SiO₂ + ZrO₂ | 67.12 | 68.77 | 64.94 | 68.63 |
| Al₂O₃/SiO₂ | 0.092 | 0.157 | 0.092 | 0.157 |
| Specific gravity | 2.544 | | 2.553 | |
| Glass transition temp [° C.] | 679 | | 679 | |
| Average linear expansion coefficient 100 to 300° C. [×10⁻⁷/° C.] | 67 | | 66 | |
| Average linear expansion coefficient 500 to 600° C. [×10⁻⁷/° C.] | 77 | | 76 | |
| Young's modulus [GPa] | 84.1 | | 84.9 | |
| Specific modulus of elasticity [MN/kg] | 33.1 | | 33.3 | |

| | | No. 13 | No. 14 |
|---|---|---|---|
| Fracture toughness value [MPa · m^(1/2)] | Strengthening temp. = 400° C. Strengthening period = 4 hours Potassium nitrate:sodium nitrate = 60%:40% | 1.33 | 1.24 |
| | Strengthening temp. = 450° C. Strengthening period = 4 hours Potassium nitrate:sodium nitrate = 60%:40% | 1.6 | 1.35 |
| | Strengthening temp. = 500° C. Strengthening period = 4 hours Potassium nitrate:sodium nitrate = 60%:40% | 1.74 | 1.58 |

TABLE 4-continued

| | | |
|---|---|---|
| Tav/Tmax<br>Strengthening temp. = 400° C.<br>Strengthening period = 4 hours<br>Potassium nitrate:sodium nitrate = 60%:40% | 0.76 | 0.77 |

| | No. 15 | | No. 16 | |
|---|---|---|---|---|
| | mol % | mass % | mol % | mass % |
| $SiO_2$ | 64.61 | 64.19 | 64.02 | 63.59 |
| $Al_2O_3$ | 5.96 | 10.06 | 5.91 | 9.96 |
| $Li_2O$ | 0.4 | 0.2 | 0.2 | 0.1 |
| $Na_2O$ | 8.55 | 8.76 | 8.67 | 8.88 |
| $K_2O$ | 0 | 0 | 0 | 0 |
| MgO | 16.9 | 11.26 | 16.74 | 11.15 |
| CaO | 1.59 | 1.48 | 2.49 | 2.31 |
| SrO | 0 | 0 | 0 | 0 |
| BaO | 0 | 0 | 0 | 0 |
| $ZrO_2$ | 1.99 | 4.05 | 1.97 | 4.01 |
| Total | 100.00 | 100.00 | 100.00 | 100.00 |
| CaO/RO | 0.086 | 0.116 | 0.129 | 0.172 |
| $CaO/Na_2O$ | 0.186 | 0.169 | 0.287 | 0.260 |
| MgO + CaO + SrO + BaO(=RO) | 18.49 | 12.74 | 19.23 | 13.46 |
| MgO + CaO + BaO | 18.49 | 12.74 | 19.23 | 13.46 |
| CaO/(MgO + CaO + BaO) | 0.086 | 0.116 | 0.129 | 0.172 |
| $K_2O/Na_2O$ | 0 | 0 | 0 | 0 |
| $ZrO_2 + TiO_2 + Y_2O_3 + La_2O_3 + Gd_2O_3 + Yb_2O_3 + Nb_2O_5 + Ta_2O_5 + HfO_2$ | 1.99 | 4.05 | 1.97 | 4.01 |
| $SiO_2 + ZrO_2 + TiO_2 + Y_2O_3 + La_2O_3 + Gd_2O_3 + Yb_2O_3 + Nb_2O_5 + Ta_2O_5 + HfO_2$ | 66.6 | 68.24 | 65.99 | 67.6 |
| $SiO_2 + ZrO_2$ | 66.6 | 68.24 | 65.99 | 67.6 |
| $Al_2O_3/SiO_2$ | 0.092 | 0.157 | 0.092 | 0.157 |
| Specific gravity | 2.562 | | 2.569 | |
| Glass transition temp [° C.] | 681 | | 681 | |
| Average linear expansion coefficient 100 to 300° C. [×$10^{-7}$/° C.] | 67 | | 68 | |
| Average linear expansion coefficient 500 to 600° C. [×$10^{-7}$/° C.] | 78 | | 79 | |
| Young's modulus [GPa] | 85.1 | | 85.8 | |
| Specific modulus of elasticity[MN/kg] | 33.2 | | 33.4 | |
| Fracture toughness value [MPa·$m^{1/2}$] Strengthening temp. = 400° C. Strengthening period = 4 hours Potassium nitrate:sodium nitrate = 60%:40% | 1.1 | | 1.1 | |
| Strengthening temp. = 450° C. Strengthening period = 4 hours Potassium nitrate:sodium nitrate = 60%:40% | 1.28 | | 1.28 | |
| Strengthening temp. = 500° C. Strengthening period = 4 hours Potassium nitrate:sodium nitrate = 60%:40% | 1.41 | | 1.41 | |
| Tav/Tmax Strengthening temp. = 400° C. Strengthening period = 4 hours Potassium nitrate:sodium nitrate = 60%:40% | 0.65 | | 0.52 | |

TABLE 5

| Glass Composition [mol %] | No. 17 |
|---|---|
| $SiO_2$ | 65 |
| $Al_2O_3$ | 6 |
| $Li_2O$ | 1 |
| $Na_2O$ | 8 |
| $K_2O$ | 0 |
| MgO | 12 |
| CaO | 5 |
| SrO | 0 |
| BaO | 0 |
| $ZrO_2$ | 3 |
| Total | 100 |
| CaO/RO | 0.294 |
| $CaO/Na_2O$ | 0.625 |
| MgO + CaO + SrO + BaO(=RO) | 17 |
| MgO + CaO + BaO | 17 |
| CaO/(MgO + CaO + BaO) | 0.294 |
| $K_2O/Na_2O$ | 0 |
| $ZrO_2 + TiO_2 + Y_2O_3 + La_2O_3 + Gd_2O_3 + Yb_2O_3 + Nb_2O_5 + Ta_2O_5 + HfO_2$ | 3 |
| $SiO_2 + ZrO_2 + TiO_2 + Y_2O_3 + La_2O_3 + Gd_2O_3 + Yb_2O_3 + Nb_2O_5 + Ta_2O_5 + HfO_2$ | 68 |
| $SiO_2 + ZrO_2$ | 68 |
| $Al_2O_3/SiO_2$ | 0.092 |
| Specific gravity | 2.6 |
| Glass transition temp. [° C.] | 670 |

TABLE 5-continued

| Glass Composition [mol %] | No. 17 |
|---|---|
| Average coefficient of linear expansion 100 to 300° C. [×$10^{-7}$/° C.] | 67 |
| Average coefficient of linear expansion 500 to 600° C. [×$10^{-7}$/° C.] | 78 |
| Young's modulus [GPa] | 85.2 |
| Specific modulus of elasticity [MN/kg] | 32.8 |

3. Evaluation of Magnetic Disks (1) Flatness

Generally, a degree of flatness of equal to or lower than 5 μm permits highly reliable recording and reproduction. The degree of flatness (the distance (difference in height) in the vertical direction (direction perpendicular to the surface) of the highest portion and lowest portion of the disk surfaces) of the surfaces of the various magnetic disks formed using the glass substrates of Examples by the above-described methods was measured with a flatness measuring apparatus. All of the magnetic disks had degrees of flatness of equal to or lower than 5 μm. From these results, it can be determined that the glass substrates of Examples did not undergo substantial deformation even when processed at high temperature during the formation of an FePt layer or CoPt layer.

(2) Load/Unload Test

The various magnetic disks formed using the glass substrates of Examples by the above methods were loaded into a 2.5-inch hard disk drive that rotated at a high speed of 10,000 rpm and subjected to a load/unload test ("LUL" hereinafter). The spindle of the spindle motor in the above hard disk drive was made of stainless steel. The durability of all of the magnetic disks exceeded 600,000 cycles. Further, although crash failures and thermal asperity failures will occur during LUL testing with deformation due to a difference in the coefficient of thermal expansion with the spindle material and deflection due to high-speed rotation, such failures did not occur during testing of any of the magnetic disks.

(3) Impact Resistance Testing

Glass substrates for magnetic disks (2.5 inches, sheet thickness 0.8 mm) were prepared. A Model-15D made by Lansmont was employed to conduct impact testing. In the impact testing, the magnetic disk glass substrate was assembled into a dedicated impact testing jig prepared with a spindle and clamp members similar to those of a HDD, an impact in the form of a half sine wave pulse of 1,500 G was applied perpendicularly for 1 msec to the main surface, and the damage to the magnetic disk glass substrate was observed. As a result, no damage was observed in the glass substrates of Examples.

Based on the above results, the present invention was confirmed to yield a glass substrate for a magnetic recording medium that afforded excellent impact resistance and permitted recording and reproduction with high reliability.

A glass disk prepared by the above method using the glass substrate of Examples was loaded into the hard disk drive of a recording mode in which magnetization reversal was assisted by irradiating the magnetic disk with a laser beam (heat-assisted recording method) and a magnetic recording medium of the heat-assisted recording type was prepared. The magnetic recording apparatus contained a heat-assisted magnetic recording head with a heat source (laser beam source) heating the main surface of a magnetic recording medium (magnetic disk), a recording element and a reproduction element, and a magnetic disk. The magnetic head of the magnetic recording apparatus was a DFH (dynamic flying height) head and the rotational speed of the magnetic disk was 10,000 rpm. A separately prepared magnetic disk was loaded into a hard disk drive employing a recording mode assisted by microwaves (microwave-assisted recording mode) and a microwave-assisted recording mode information recording apparatus was prepared. Both of the HDDs (Hard disk drives) thus prepared operated well. Such information recording apparatuses, combining a high Ku magnetic material and energy-assisted recording, permitted high-density recording in the manner set forth above.

The modes for carrying out the invention that have been disclosed herein are examples in all respects and are not to be construed as limitations. The scope of the present invention is indicated by the claims, not the description set forth above, and is intended to cover all modifications with meanings and within the scope equivalent to the claims.

The present invention can provide an optimal magnetic recording medium for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. Glass for a magnetic recording medium substrate, which comprises: essential components in the form of $SiO_2$, $Li_2O$, $Na_2O$, and one or more alkaline earth metal oxides selected from the group consisting of MgO, CaO, SrO, and BaO; wherein a molar ratio of a content of CaO to a combined content of MgO, CaO, SrO, and BaO (CaO/(MgO+CaO+SrO+BaO)) is equal to or less than 0.20; and which has a glass transition temperature of equal to or higher than 650° C.

2. The glass for a magnetic recording medium substrate according to claim 1, which comprises, denoted as molar percentages,
   55 to 78 percent of $SiO_2$,
   greater than 0 percent and equal to or less than 5 percent of $Li_2O$,
   2 to 15 percent of $Na_2O$, and
   10 to 25 percent of a combined content of MgO, CaO, SrO, and BaO.

3. The glass for a magnetic recording medium substrate according to claim 2, which comprises 0 to 12 mole percent of $Al_2O_3$.

4. The glass for a magnetic recording medium substrate according to claim 1, wherein a molar ratio, CaO/Na$_2$O, of a content of CaO relative to a content of Na$_2$O is equal to or less than 1.5.

5. The glass for a magnetic recording medium substrate according to claim 1, which comprises one or more selected from the group consisting of ZrO$_2$, TiO$_2$, Y$_2$O$_3$, La$_2$O$_3$, Gd$_2$O$_3$, Nb$_2$O$_5$, Ta$_2$O$_5$, and HfO$_2$.

6. The glass for a magnetic recording medium substrate according to claim 5, wherein a combined content of SiO$_2$, ZrO$_2$, TiO$_2$, Y$_2$O$_3$, La$_2$O$_3$, Gd$_2$O$_3$, Yb$_2$O$_3$, Nb$_2$O$_5$, Ta$_2$O$_5$, and HfO$_2$ is equal to or greater than 66 mole percent.

7. The glass for a magnetic recording medium substrate according to claim 1, wherein a combined content of ZrO$_2$, TiO$_2$, Y$_2$O$_3$, La$_2$O$_3$, $_2$, Nb$_2$O5, Ta$_2$O5, and HfO$_2$ ranges from 0 to 10 mole percent.

8. The glass for a magnetic recording medium substrate according to claim 1, which comprises 0 to 6 mole percent of ZrO$_2$.

9. The glass for a magnetic recording medium substrate according to claim 1, wherein a combined content of SiO$_2$ and ZrO$_2$ is equal to or greater than 66 mole percent.

10. The glass for a magnetic recording medium substrate according to claim 1, which has an average coefficient of linear expansion at 100 to 300° C. of equal to or greater than 50×10$^{-7}$/° C., a Young's modulus of equal to or greater than 75 GPa, and a specific modulus of elasticity of equal to or greater than 25 MNm/kg.

11. A glass substrate for a magnetic recording medium, comprising:
a glass having essential components in the form of SiO$_2$, Li$_2$O, Na$_2$O, and
one or more alkaline earth metal oxides selected from the group consisting of MgO, CaO, SrO, and BaO;
wherein a molar ratio of a content of CaO to a combined content of MgO, CaO, SrO, and BaO (CaO/(MgO+CaO+SrO+BaO)) is equal to or less than 0.20;
wherein the glass has a transition temperature of equal to or higher than 650° C.; and
wherein the glass has a compressive stress layer proximate a surface of the substrate and formed by chemical strengthening.

12. The glass substrate for a magnetic recording medium according to claim 11, which comprises chemically strengthened glass in which a tensile stress distribution is convex in shape such that the convex shape does not contain indentations indenting to a compressive stress side in a stress profile in a virtual cross section perpendicular to two main surfaces as obtained by a Babinet method.

13. The glass substrate for a magnetic recording medium according to claim 11, which comprises chemically strengthened glass in which an average value Tav of a tensile stress obtained by a Babinet method and a maximum value Tmax of the tensile stress satisfy the following equation (1):

$$Tav/Tmax \geq 0.5.$$

14. The glass substrate for a magnetic recording medium according to claim 11, wherein the chemically strengthened glass comprises glass that has been chemically strengthened by immersion into a mixed salt melt of sodium salt and potassium salt.

15. The glass substrate for a magnetic recording medium according to claim 14, which comprises glass that has been chemically strengthened by immersing glass which comprises equal to or greater than 0.1 mole percent of Li$_2$O into the mixed salt melt.

16. The glass substrate for a magnetic recording medium according to claim 11, which has a fracture toughness value K1c of equal to or greater than 0.8 MPam$^{1/2}$.

17. The glass substrate for a magnetic recording medium according to claim 11, wherein an arithmetic average surface roughness (Ra) over an area of 1 µm×1 µm on a main surface measured by an atomic force microscope at a resolution of 512×256 pixels is equal to or lower than 0.15 nm.

18. The glass substrate for a magnetic recording medium according to claim 11, which has a plate thickness of equal to or lower than 0.5 mm.

19. A glass substrate for a magnetic recording medium, which comprises:
a chemically strengthened glass,
wherein said glass is characterized by (1) a glass transition temperature of equal to or higher than 650° C., and (2) a tensile stress distribution that is convex in shape such that the convex shape does not contain indentations indenting to a compressive stress side in a stress profile in a virtual cross section perpendicular to two main surfaces as obtained by a Babinet method.

20. A glass substrate for a magnetic recording medium, which comprises:
a chemically strengthened glass,
wherein said glass is characterized by (1) a glass transition temperature of equal to or higher than 650° C., and (2) an average value Tav of a tensile stress obtained by a Babinet method and a maximum value Tmax of the tensile stress that satisfy the following equation (1):

$$Tav/Tmax \geq 0.5.$$

21. A glass substrate blank for a magnetic recording medium, which comprises: essential components in the form of SiO$_2$, Li$_2$O, Na$_2$O, and one or more alkaline earth metal oxides selected from the group consisting of MgO, CaO, SrO, and BaO; wherein a molar ratio of a content of CaO to a combined content of MgO, CaO, SrO, and BaO (CaO/(MgO+CaO+SrO+BaO)) is equal to or less than 0.20; and which has a glass transition temperature of equal to or higher than 650° C.

22. A method of manufacturing a glass substrate blank for a magnetic recording medium, which comprises: blending glass starting materials to provide glass comprising essential components in the form of SiO$_2$, Li$_2$O, Na$_2$O, and one or more alkaline earth metal oxides selected from the group consisting of MgO, CaO, SrO, and BaO; wherein a molar ratio of a content of CaO to a combined content of MgO, CaO, SrO, and BaO (CaO/(MgO+CaO+SrO+BaO)) is equal to or less than 0.20; and which has a glass transition temperature of equal to or higher than 650° C.; melting the blended glass starting materials to provide a glass melt; and press molding the glass melt that has been provided to prepare a substrate blank comprised of the glass.

23. The method of manufacturing a glass substrate blank for a magnetic recording medium according to claim 22, which comprises press molding the glass melt in the air.

24. A method of manufacturing a glass substrate for a magnetic recording medium, which comprises:
preparing a glass substrate blank for a magnetic recording medium by the method according to claim 22; and
processing the substrate blank.

25. A method of manufacturing a glass substrate for a magnetic recording medium, comprising:
processing a glass substrate blank for a magnetic recording medium which comprises: essential components in the form of SiO$_2$, Li$_2$O Na$_2$O, and one or more alkaline earth metal oxides selected from the group consisting of MgO, CaO, SrO, and BaO; wherein a molar ratio of a content of CaO to a combined content of MgO, CaO, SrO, and BaO (CaO/(MgO+CaO+SrO+BaO)) is equal to or less than 0.20; and which has a glass transition temperature of equal to or higher than 650° C.

26. A magnetic recording medium, comprising:
a glass, said glass having essential components in the form of $SiO_2$, $Li_2O$, $Na_2O$, and
one or more alkaline earth metal oxides selected from the group consisting of MgO, CaO, SrO, and BaO;
  wherein a molar ratio of a content of CaO to a combined content of MgO, CaO, SrO, and BaO (CaO/(MgO+CaO+SrO+BaO)) is equal to or less than 0.20;
  wherein the glass has a transition temperature of equal to or higher than 650° C.; and
  wherein the glass has a compressive stress layer proximate a surface of the substrate and formed by chemical strengthening, and
a magnetic recording layer on the glass substrate for a magnetic recording medium.

27. A magnetic recording apparatus of energy-assisted magnetic recording system, which comprises:
a heat-assisted magnetic recording head having a heat source to heat at least a main surface of a magnetic recording medium,
a recording element member, and a reproduction element member; and
a magnetic recording medium, comprising:
a glass, said glass having essential components in the form of $SiO_2$, $Li_2O$, $Na_2O$, and one or more alkaline earth metal oxides selected from the group consisting of MgO, CaO, SrO, and BaO;
  wherein a molar ratio of a content of CaO to a combined content of MgO, CaO, SrO, and BaO (CaO/(MgO+CaO+SrO+BaO)) is equal to or less than 0.20;
  wherein the glass has a transition temperature of equal to or higher than 650° C.; and
  wherein the glass has a compressive stress layer proximate a surface of the substrate and formed by chemical strengthening, and
a magnetic recording layer on the glass substrate for a magnetic recording medium.

28. The magnetic recording apparatus according to claim 27, wherein a rotational speed is equal to or higher than 5000 rpm.

29. The magnetic recording apparatus according to claim 27, which is equipped with a DFH (Dynamic Flying Height) head.

\* \* \* \* \*